US010958404B2

(12) United States Patent
Yerramalli et al.

(10) Patent No.: US 10,958,404 B2
(45) Date of Patent: Mar. 23, 2021

(54) DISCOVERY REFERENCE SIGNAL CONFIGURATION AND SCRAMBLING IN LICENSED-ASSISTED ACCESS

(71) Applicant: QUALCOMM Incorporated, San Diego, CA (US)

(72) Inventors: Srinivas Yerramalli, San Diego, CA (US); Peter Gaal, San Diego, CA (US); Tao Luo, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 42 days.

(21) Appl. No.: 15/270,720

(22) Filed: Sep. 20, 2016

(65) Prior Publication Data

US 2017/0134148 A1   May 11, 2017

Related U.S. Application Data

(60) Provisional application No. 62/252,271, filed on Nov. 6, 2015.

(51) Int. Cl.
*H04L 5/00* (2006.01)
*H04W 72/04* (2009.01)
(Continued)

(52) U.S. Cl.
CPC ......... *H04L 5/0094* (2013.01); *H04W 48/16* (2013.01); *H04W 72/042* (2013.01); *H04W 16/14* (2013.01)

(58) Field of Classification Search
CPC .................................................. H04L 5/0094
(Continued)

(56) References Cited

U.S. PATENT DOCUMENTS

2010/0246585 A1   9/2010  Mantri et al.
2015/0055588 A1   2/2015  Yerramalli et al.
(Continued)

FOREIGN PATENT DOCUMENTS

CN   102804657 A   11/2012
CN   103427968 A   12/2013
(Continued)

OTHER PUBLICATIONS

International Search Report and Written Opinion—PCT/US2016/052775—ISA/EPO—dated Nov. 17, 2016. 15 pages.
(Continued)

*Primary Examiner* — Edan Orgad
*Assistant Examiner* — Abdeltif Ajid
(74) *Attorney, Agent, or Firm* — Arent Fox, LLP

(57) ABSTRACT

The disclosure provides for receiving a downlink transmission for wireless communications. A user equipment (UE) may receive, on a primary component carrier, an indication that a subframe of a secondary component carrier includes a discovery reference signal. During the subframe, the UE may receive, on the secondary component carrier over an unlicensed spectrum, a transmission including the discovery reference signal. The UE may rate match the transmission based on the indication. The disclosure further provides for discovering timing information during wireless communications. The UE may receive on a primary component carrier, an indication that a set of subframes of a carrier of a neighboring cell includes a discovery reference signal. The UE may determine a subframe to receive the discovery reference signal based on the indication. The UE may receive during the subframe, the discovery reference signal from the neighboring cell in an unlicensed spectrum.

30 Claims, 12 Drawing Sheets

(51) Int. Cl.
*H04W 48/16* (2009.01)
*H04W 16/14* (2009.01)

(58) Field of Classification Search
USPC ......................................................... 370/329
See application file for complete search history.

(56) References Cited

U.S. PATENT DOCUMENTS

| | | | | |
|---|---|---|---|---|
| 2015/0092768 | A1* | 4/2015 | Ng | H04W 48/16 370/350 |
| 2015/0131568 | A1 | 5/2015 | You et al. | |
| 2015/0189574 | A1 | 7/2015 | Ng et al. | |
| 2015/0289208 | A1 | 10/2015 | Liu et al. | |
| 2017/0201898 | A1* | 7/2017 | Park | H04L 5/0048 |
| 2018/0192355 | A1* | 7/2018 | Kim | H04J 11/00 |
| 2018/0249339 | A1* | 8/2018 | Noh | H04L 27/261 |
| 2018/0302195 | A1* | 10/2018 | Kim | H04L 1/18 |
| 2018/0302203 | A1* | 10/2018 | Kim | H04L 5/0091 |

FOREIGN PATENT DOCUMENTS

| | | | |
|---|---|---|---|
| CN | 104968052 A | 10/2015 | |
| CN | 105634698 A | 6/2016 | |
| WO | WO 2016/148530 A1 * | 9/2016 | ............. H04J 11/00 |
| WO | 2017069571 A1 | 4/2017 | |

OTHER PUBLICATIONS

"LTE; Evolved Universal Terrestrial Radio Access (E-UTRA); Physical channels and modulation (3GPP TS 36.211 version 12.7.0 Release 12)", Oct. 1, 2015 (Oct. 1, 2015), pp. 1-137, XP014265417.

"LTE; Evolved Universal Terrestrial Radio Access (E-UTRA); Radio Resource Control (RRC); Protocol specification (3GPP TS 36.331 version 12.7.0 Release 12)", Oct. 1, 2015 (Oct. 1, 2015), pp. 1-454, XP014265434.

Motorola Mobility: "Physical Layer Options for LAA-LTE", 3GPP TSG RAN WG1 #78bis, R1-144236, Oct. 6, 2014-Oct. 10, 2014, Ljubljana, Slovenia, Oct. 10, 2014 (Oct. 10, 2014), pp. 1-2.

NTT Docomo, Inc: "Discussion on DRES Design for LAA", 3GPP TSG RAN WG1 Meeting #82bis, R1-155901, Malmö, Sweden, Oct. 5-9, 2015, pp. 1-10.

* cited by examiner

DISCOVERY REFERENCE SIGNAL CONFIGURATION AND SCRAMBLING IN LICENSED-ASSISTED ACCESS

CROSS-REFERENCE TO RELATED APPLICATIONS

The present Application for Patent claims priority to U.S. Provisional Application No. 62/252,271 entitled "DISCOVERY REFERENCE SIGNAL CONFIGURATION AND SCRAMBLING IN LICENSED-ASSISTED ACCESS" filed Nov. 6, 2015, which is assigned to the assignee hereof and hereby expressly incorporated by reference herein.

BACKGROUND

Aspects of this disclosure relate generally to telecommunications, and more particularly to techniques for configuring and scrambling discovery signals in unlicensed spectrum.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Some modes of communication may enable communications between a base station and a user equipment (UE) over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

In some wireless networks, the timing of certain reference signals may vary or otherwise be unknown in advance to a UE. For example, for a UE configured with a licensed-assisted access (LAA) secondary cell (SCell), the timing of the SCell can be derived from the timing of a corresponding primary cell (PCell) through a carrier aggregation (CA) framework. As such, for the serving SCell, the scrambling sequences used in each subframe can be determined using this relationship. In contrast, when a UE performs neighbor cell measurements to detect other LAA cells, e.g., belonging to either a serving public land mobile network (PLMN) or a neighboring PLMN, the timing of such cells may not be known by the UE.

As such, in this instance, the UE may listen for reference signals during a discovery window. However, these reference signals may be received at a variable position within the discovery window. As the scrambling of such reference signals may be based on a specific timing, the UE may consume vast resources processing different hypothesis for the scrambling sequence used in transmitting the received reference signals. Thus, given the growing use of the unlicensed spectrum, improvements in reference signal transmission and reception may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure describes techniques for detecting and descrambling a discovery reference signal (DRS) by a user equipment (UE) using licensed-assisted access (LAA) for accessing resources in an unlicensed spectrum. The UE may use the detected and descrambled DRS to perform neighbor cell measurements in connection to processes like cell selection for the unlicensed spectrum. An unlicensed or shared spectrum may refer to a spectrum in which access is achieved, at least by some devices, through a contention-based approach.

In accordance with an aspect, a present method of communication in a wireless communication network is provided. The described aspects include receiving, by a user equipment (UE), a discovery reference signal (DRS) at a received subframe. Further, a transmitted subframe of the DRS is unknown. The described aspects include determining a relative position of the received subframe with respect to a discovery window. Additionally, the described aspects include selecting a scrambling sequence from a plurality of scrambling sequences based on the relative position of the received subframe with respect to the discovery window.

In accordance with an aspect, a present apparatus for communication in a wireless communications network includes a memory component, a transceiver configured to receive a discovery reference signal (DRS) at a received subframe, and a processor coupled to the transceiver and the memory component. Further, a transmitted subframe of the DRS is unknown. Additionally, the processor is configured to determine a relative position of the received subframe with respect to a discovery window and selecting a scrambling sequence from a plurality of scrambling sequences based on the relative position of the received subframe with respect to the discovery window.

In accordance with an aspect, a present computer-readable medium may store computer executable code for communication in a wireless communications system. The described aspects include code for receiving, by a user equipment (UE), a discovery reference signal (DRS) at a received subframe. Further, a transmitted subframe of the DRS is unknown. The described aspects include code for determining a relative position of the received subframe with respect to a discovery window. Additionally, the described aspects include code for selecting a scrambling sequence from a plurality of scrambling sequences based on the relative position of the received subframe with respect to the discovery window.

In accordance with an aspect, a present apparatus for communication in a wireless communications system is provided. The described aspects include means for receiving, by a user equipment (UE), a discovery reference signal (DRS) at a received subframe. Further, a transmitted subframe of the DRS is unknown. The described aspects include means for determining a relative position of the received subframe with respect to a discovery window. Additionally, the described aspects include means for selecting a scrambling sequence from a plurality of scrambling sequences based on the relative position of the received subframe with respect to the discovery window.

In accordance with an aspect, a present method of communication in a wireless communications network is provided. The described aspects include receiving, by a user equipment (UE), a cell-specific reference signal (CRS) at a received subframe. The transmitted subframe of the CRS is unknown. The described aspects further include determining a relative position of the received subframe with respect to a discovery window. Additionally, the described aspects include determining the presence of channel state information (CSI) resources based on the relative position of the received subframe with respect to the discovery window.

In accordance with an aspect, an apparatus for communication in a wireless communications network includes a memory component, a transceiver configured to receive a cell-specific reference signal (CRS) at a received subframe, and a processor coupled to the transceiver and the memory component. A transmitted subframe of the CRS is unknown. Further, the processor is configured to determine a relative position of the received subframe with respect to a discovery window, and determine the presence of channel state information (CSI) resources based on the relative position of the received subframe with respect to the discovery window.

In accordance with an aspect, a present computer-readable medium may store computer executable code for communication in a wireless communications system. The described aspects include code for receiving, by a user equipment (UE), a cell-specific reference signal (CRS) at a received subframe. Further, a transmitted subframe of the CRS is unknown. The described aspects include code for determining a relative position of the received subframe with respect to a discovery window. Additionally, the described aspects include code for determining the presence of channel state information (CSI) resources based on the relative position of the received subframe with respect to the discovery window.

In accordance with an aspect, a present apparatus for communication in a wireless communications system is provided. The described aspects include means for receiving, by a user equipment (UE), a cell-specific reference signal (CRS) at a received subframe. Further, a transmitted subframe of the CRS is unknown. The described aspects include means for determining a relative position of the received subframe with respect to a discovery window. Additionally, the described aspects include means for determining the presence of channel state information (CSI) resources based on the relative position of the received subframe with respect to the discovery window.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a second label that distinguishes among the similar components. If the first reference label is used in the specification, the description is applicable to any one of the similar components having the same first reference label irrespective of the second reference label.

DETAILED DESCRIPTION

Figure 1:
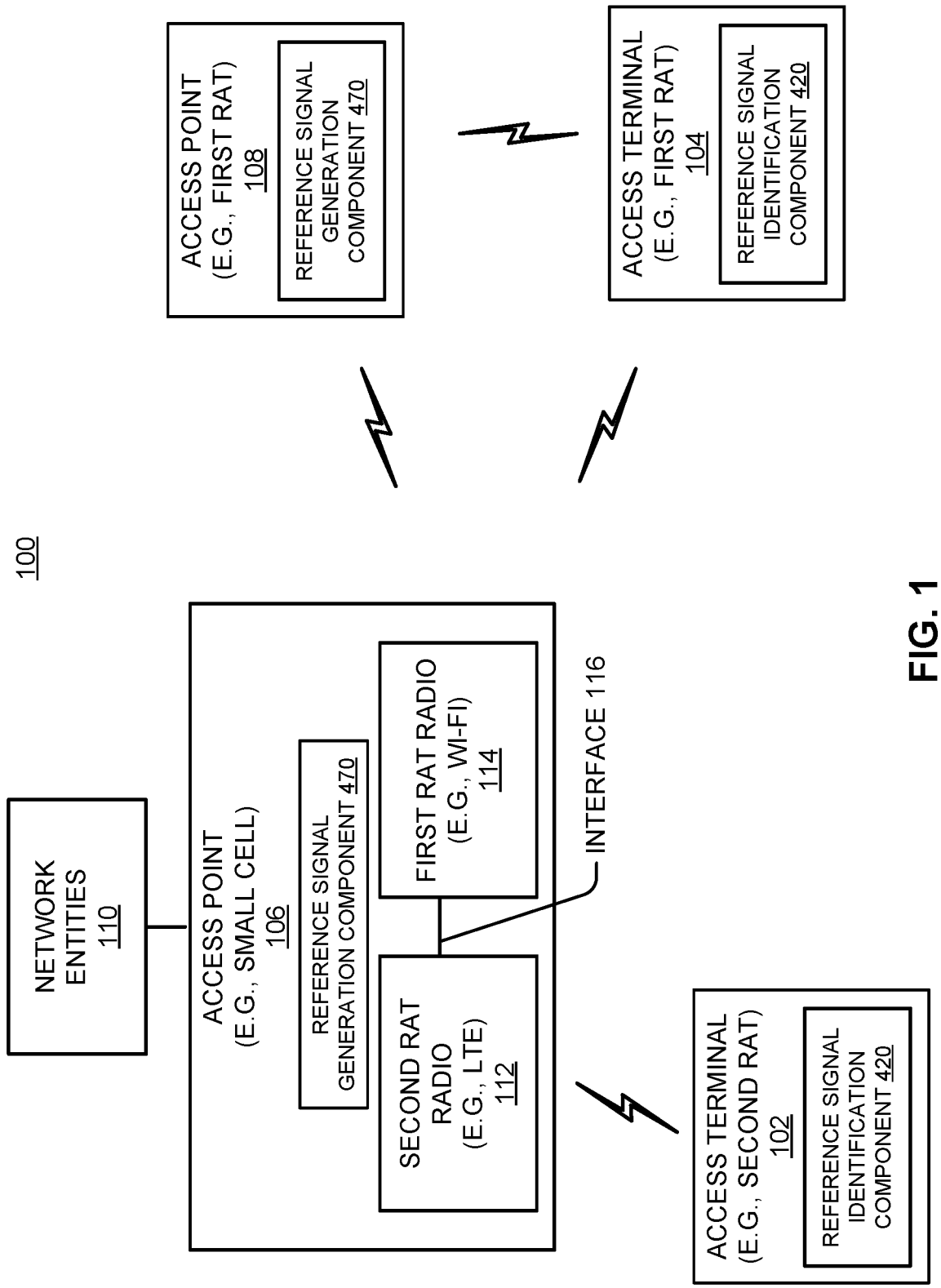
FIG. 1 is a block diagram illustrating an example wireless communication system employing one or more entities including co-located radios in accordance with the present aspects.

The present aspects generally relate to transmitting and receiving transmissions including physical layer reference signals. For example, a discovery reference signal (DRS) may include physical-layer signals, such as a primary synchronization signal (PSS), a secondary synchronization signal (SSS), and a cell-specific reference signal (CRS). A user equipment (UE) may use a DRS to identify, select, and synchronize with a cell (e.g. of a base station such as an evolved Node B). Other physical-layer reference signals may include, but are not limited to, a channel state information reference signal (CSI-RS) and/or a channel-state information—interference measurement (CSI-IM) signal, such as for radio resource management (RRM) measurements and/or channel estimation (e.g., channel quality indicator (CQI)) measurements.

Before a UE may communicate with a base station, the UE may need to discover or acquire the base station (or a cell). After a UE discovers the base station or cell, the UE may need to periodically synchronize with the base station or cell in order to properly communicate with, and decode communications from, the base station. In an aspect, the UE may periodically or aperiodically measure physical-layer reference signals transmitted by neighbor cells to determine whether to select the neighbor as a new cell for service. In some examples, the neighbor cell may transmit a reference signal, such as a synchronization signal, and the UE may receive and decode the synchronization signal to discover and/or synchronize with the neighbor cell). In some current situations, such as when the UE performs neighbor cell measurements to detect other cells related to license assisted access (LAA) of cells in an unlicensed or shared spectrum, the timing information of a neighbor cell reference signal transmissions may not be known to the UE. As such, upon receiving the reference signal, the UE may use excessive resources to process the received reference signals in order to determine the timing to synchronize with and perform received signal measurements of transmissions by the neighbor cell.

In an aspect, for example, a UE may listen during a discovery window for a discovery reference signal (e.g., "discovery signal" or "DRS") transmitted at different times from a network entity to the UE. In an aspect, the discovery window may be defined by a DRS measurement timing configuration (DMTC), and thus may be referred to as a DMTC window. In an aspect, the DMTC window may include at least one radio frame (e.g., 10 ms). In an aspect, the neighbor cell may transmit a DRS during one or more specific subframes of the discovery window, and the scrambling of the DRS may be specific to the respective subframe in which it was transmitted. In an aspect, the neighbor cell may also transmit the DRS in subframes outside the discovery window. Moreover, in the LAA context, the DRS may be transmitted periodically or aperiodically, either by design or based on clear channel assessment (CCA) or listen before talk (LBT) restrictions on transmitting in unlicensed spectrum. As such, the UE may receive the DRS at a variable timing with respect to the discovery window. This variable timing, along with the fact that the UE may not know the timing of the transmitting neighboring cell, may cause problems for the UE in relation to cell detection, synchronization, and neighbor cell measurement.

Accordingly, in some aspects, the present methods and apparatuses provide a UE that may efficiently detect and descramble a DRS, such as a synchronization signal, transmitted by a neighbor cell having an unknown timing to the UE when the UE is using licensed-assisted access (LAA) for accessing resources in an unlicensed spectrum.

Further, in other aspects, the present methods and apparatuses provide a UE that may efficiently detect and descramble a DRS, such as a CSI-RS and/or a CSI-IM, transmitted by a neighbor cell having an unknown timing to the UE when the UE is using licensed-assisted access (LAA) for accessing resources in an unlicensed spectrum.

Thus, the present methods and apparatuses provide an efficient solution in comparison to current solutions by lowering the amount of processing resources utilized by the UE once it receives a DRS.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application-specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 4:
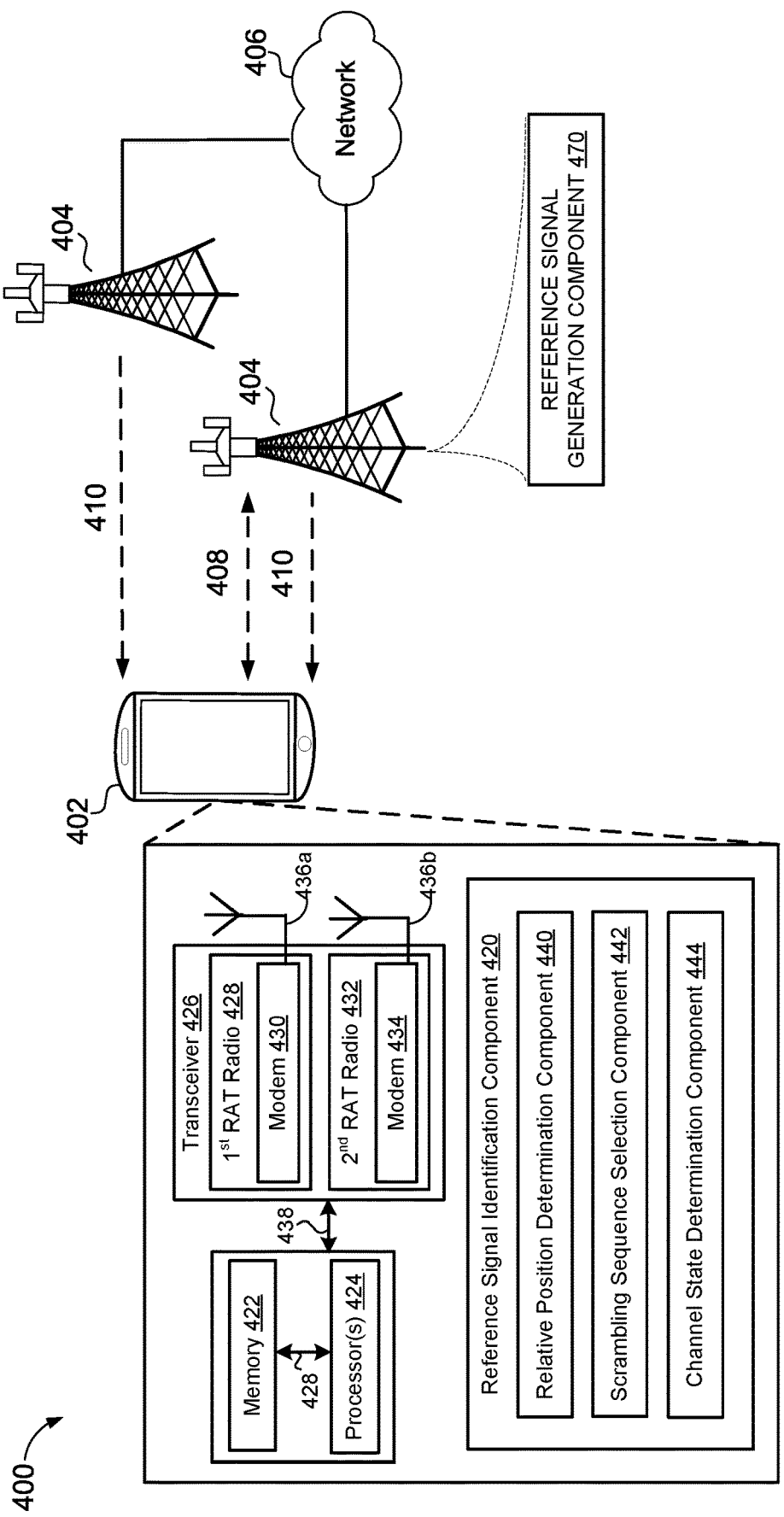
FIG. 4 is schematic diagram illustrating an example of a communication network including an aspect of transmitting and receiving physical layer reference signals during wireless communication.

FIG. 1 illustrates several nodes of an example wireless communication system 100 (e.g., a portion of a communications network). An access terminal (e.g., access terminal 102, 104) may include a reference signal identification component 420 (FIG. 4) and an access point (e.g., access point 106, 108) may include a corresponding reference signal generation component 470 (FIG. 4). The respective components are configured to operate to enable the access terminal to perform measurements on the access point in an unlicensed radio frequency spectrum band.

For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points 106, 108, which may correspond to network entity 404 including reference signal generation component 470 (FIG. 4) in the system 400, may provide access to one or more services (e.g., network connectivity) for one or more wireless terminals (e.g., access terminal 102, 104) that may be installed within or that may roam throughout a coverage area of system 100. For example, at various times, access terminal 102 may connect to the access point 106 or some other access point in system 100. Similarly, access terminal 104 may connect to access point 108 or some other access point. One or more of access points 106, 108 may communicate with one or more network entities (represented, for convenience, by network entities 110), including each other, to facilitate wide-area network (WAN) connectivity. Two or more of such network entities may be co-located and/or two or more of such network entities may be distributed throughout a network.

A network entity may take various forms such as, for example, one or more radio and/or core network entities. Thus, in various implementations, network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

When access point 106 (or any other devices in system 100) uses a first radio access technology (RAT) to communicate on a given resource, this communication may be subjected to interference from nearby devices (e.g., access point 108 and/or access terminal 104) that use a second RAT to communicate on that resource. For example, communication by the access point 106 via LTE on a particular unlicensed RF band (e.g., 5 GHz) may be subject to interference from Wi-Fi devices operating on that band. For convenience, LTE on an unlicensed RF band may be referred to herein as LTE/LTE Advanced in unlicensed spectrum, or simply LTE in the surrounding context. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL) or licensed-assisted access (LAA)). In either case, carrier aggregation (CA) may be employed to manage the different component carriers, with one carrier serving as the Primary Cell (PCell) for the corresponding UE (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

The disclosure relates in some aspects to techniques referred to herein as carrier sense adaptive transmission (CSAT), which may be used to facilitate co-existence between different technologies operating on a commonly used resource (e.g., a particular unlicensed RF band or co-channel). The access point 106 includes co-located radios (e.g., transceivers) 112 and 114. The radio 112 uses a second RAT (e.g., LTE) to communicate. The radio 114 is capable of receiving signals using a first RAT (e.g., Wi-Fi). In addition, an interface 116 enables the radios 112 and 114 to communicate with one another. In another aspect, the radio 114 may communicate using a second RAT (e.g., LTE in unlicensed spectrum) that is related to the first RAT (e.g., LTE in licensed spectrum). Radios 112, 114 may share physical-layer transmission information, such as the location of a DRS. Accordingly, the second radio 112 may transmit a DRS in a secondary component carrier while the first radio 114 sends an indication of the placement of the DRS on a primary component carrier.

Figure 2:
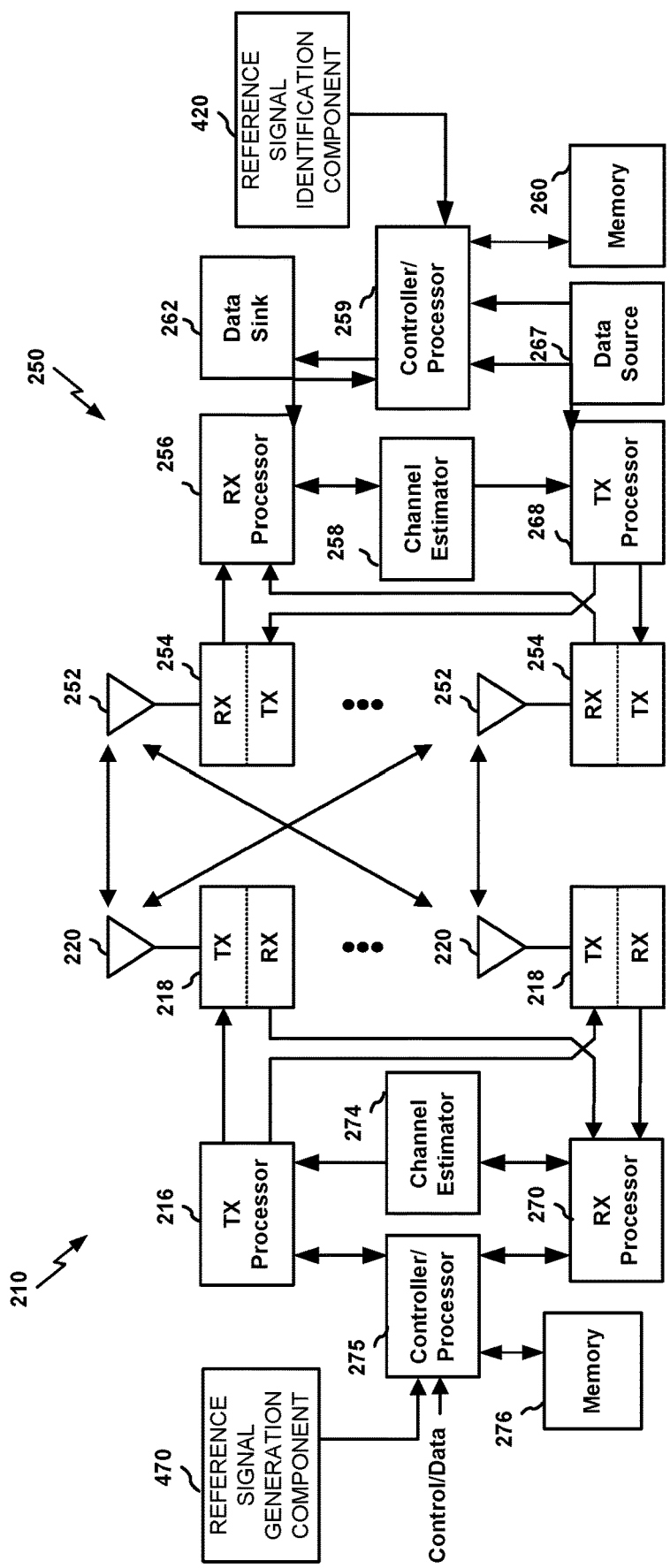
FIG. 2 is a diagram illustrating an example of an evolved Node B and user equipment in an access network according to the present aspects.

FIG. 2 is a block diagram of a base station 210 in communication with a UE 250 in an access network. In the DL, upper layer packets from the core network are provided to a controller/processor 275. The controller/processor 275 implements the functionality of the L2 layer. In the DL, the controller/processor 275 provides header compression, ciphering, packet segmentation and reordering, multiplexing between logical and transport channels, and radio resource allocations to the UE 250 based on various priority metrics. The controller/processor 275 is also responsible for HARQ operations, retransmission of lost packets, and signaling to the UE 250.

The transmit (TX) processor 216 implements various signal processing functions for the L1 layer (i.e., physical layer). The signal processing functions includes coding and interleaving to facilitate forward error correction (FEC) at the UE 250 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream is then provided to a different antenna 220 via a separate transmitter 218TX. Each transmitter 318TX modulates an RF carrier with a respective spatial stream for transmission.

In addition, base station 210 may include reference signal generation component 470 (FIG. 4) configured to transmit one or more transmissions including a discovery reference signal over an unlicensed radio frequency spectrum to a UE. Though reference signal generation component 470 is shown as coupled to controller/processor 275, it is to be appreciated that reference signal generation component 470 can also be coupled to other processors (e.g., RX processor 270, TX processor 216, etc.) and/or implemented by the one or more processors 216, 270, 275 to perform actions described herein. Furthermore, for example, reference signal generation component 470 may be implemented by any one or more of the processors including, but not limited to, processors 216, 270, and/or 275. Similarly, reference signal generation component 470 may be implemented by any one or more of the processors including, but not limited to, processors 256, 259, and/or 268.

At the UE 250, each receiver 254RX receives a signal through its respective antenna 252. Each receiver 254RX recovers information modulated onto an RF carrier and provides the information to the receive (RX) processor 256. The RX processor 256 implements various signal processing functions of the L1 layer. The RX processor 256 performs spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259.

The controller/processor 259 implements the L2 layer. The controller/processor can be associated with a memory 260 that stores program codes and data. The memory 260 may be referred to as a computer-readable medium. In the UL, the controller/processor 259 provides demultiplexing between transport and logical channels, packet reassembly, deciphering, header decompression, control signal processing to recover upper layer packets from the core network. The upper layer packets are then provided to a data sink 262, which represents all the protocol layers above the L2 layer. Various control signals may also be provided to the data sink 262 for L3 processing. The controller/processor 259 is also responsible for error detection using an acknowledgement (ACK) and/or negative acknowledgement (NACK) protocol to support HARQ operations. In addition, UE 250 may include a reference signal identification component 420 (see e.g., FIG. 4) configured to monitor for the one or more discovery reference signals. Though reference signal identification component 420 is shown as coupled to controller/processor 259, it is to be appreciated that reference signal identification component 420 can also be coupled to other processors (e.g., RX processor 256, TX processor 268, etc.) and/or implemented by the one or more processors 256, 259, 268 to perform actions described herein.

In the UL, a data source 267 is used to provide upper layer packets to the controller/processor 259. The data source 267 represents all protocol layers above the L2 layer. Similar to the functionality described in connection with the DL transmission by the base station 210, the controller/processor 259 implements the L2 layer for the user plane and the control plane by providing header compression, ciphering, packet segmentation and reordering, and multiplexing between logical and transport channels based on radio resource allocations by the base station 310. The controller/processor 259 is also responsible for HARQ operations, retransmission of lost packets, and signaling to the base station 210.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 368 are provided to different antenna 252 via separate transmitters 254TX. Each transmitter 254TX modulates an RF carrier with a respective spatial stream for transmission.

The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270. The RX processor 270 may implement the L1 layer.

The controller/processor 275 implements the L2 layer. The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover upper layer packets from the UE 250. Upper layer packets from the controller/processor 275 may be provided to the core network. The controller/processor 275 is also responsible for error detection using an ACK and/or NACK protocol to support HARQ operations.

Figure 3A:
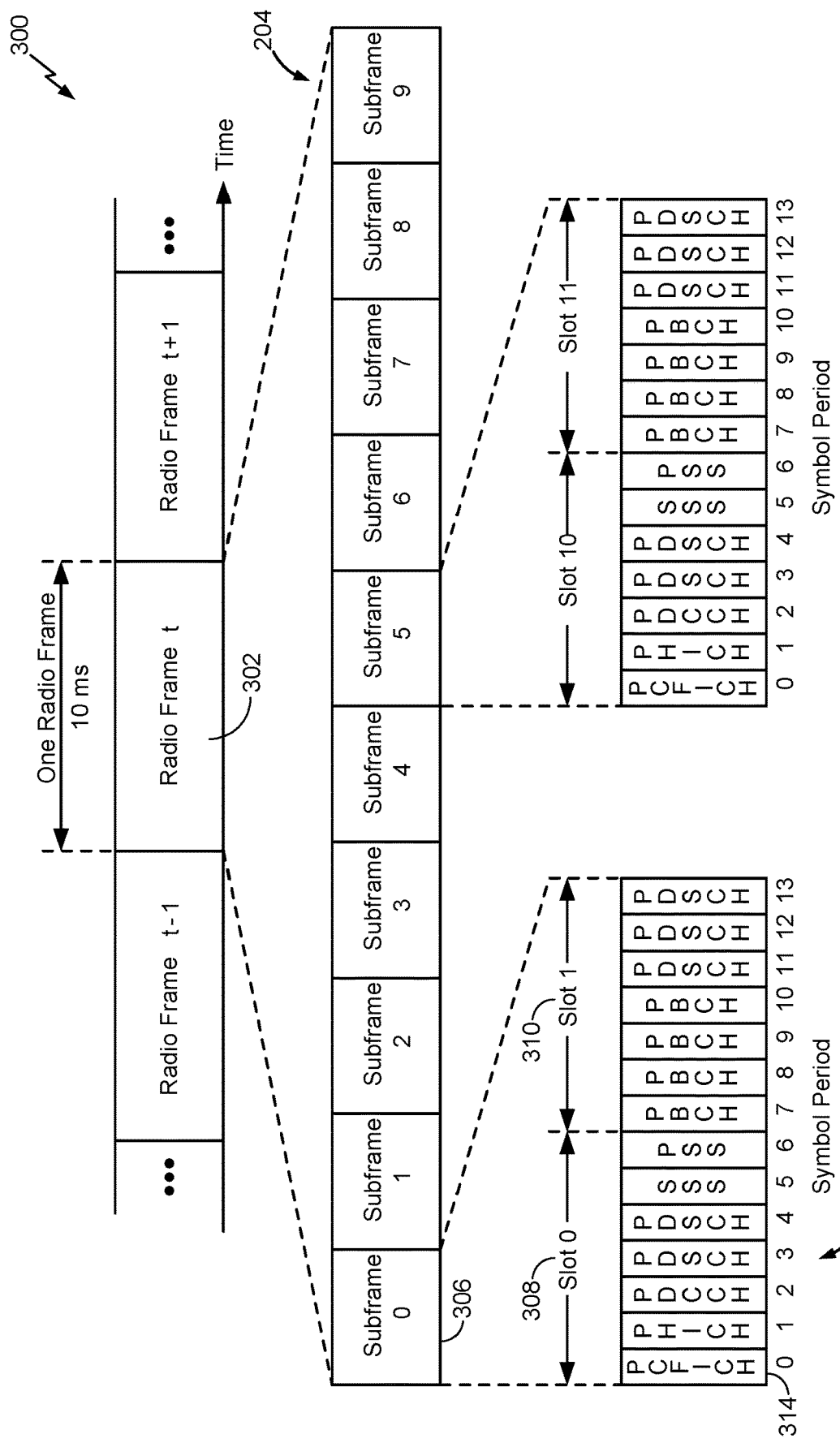
FIG. 3A illustrates a downlink frame structure used in LTE in accordance with the present aspects.
Figure 6:
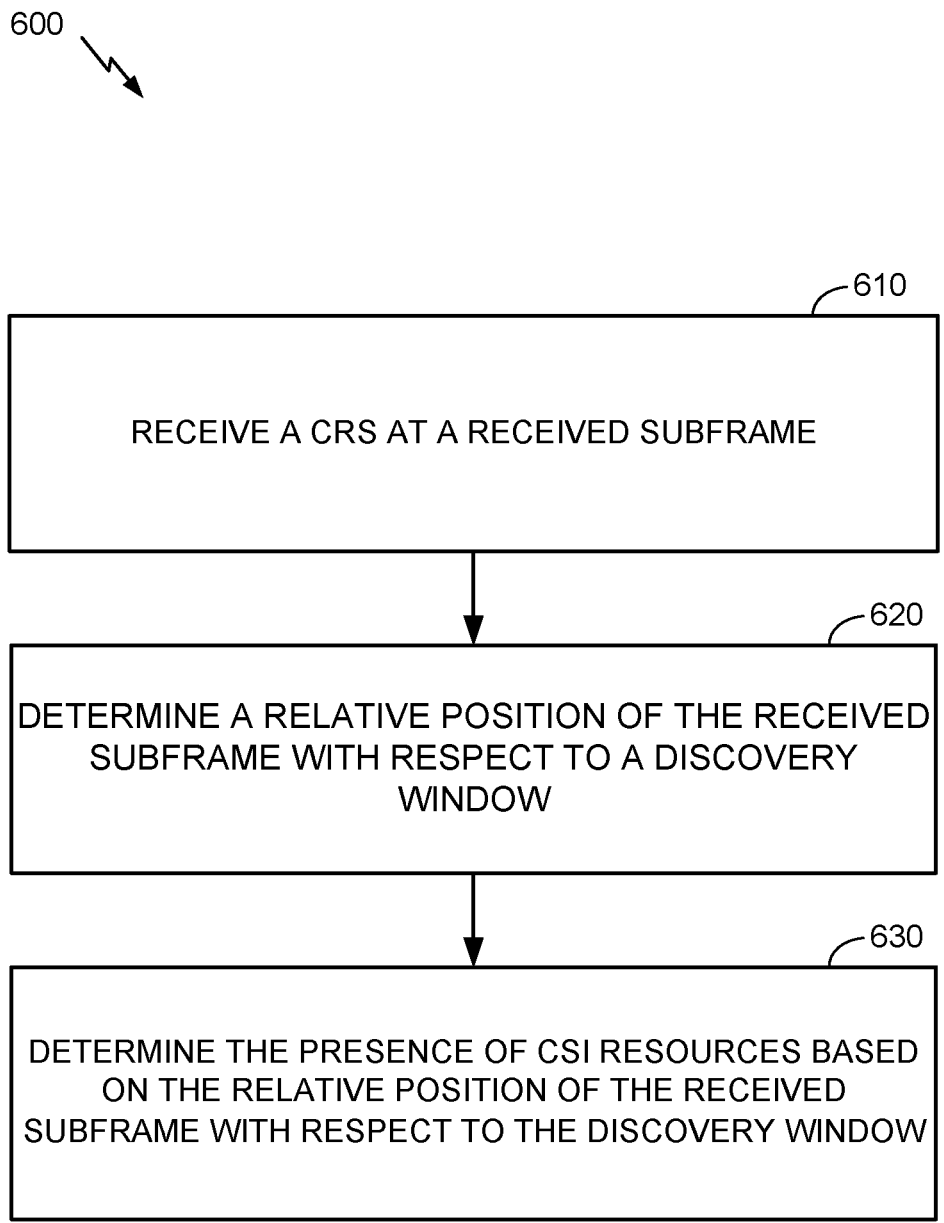
FIG. 6 is a flow diagram illustrating another example method of receiving a physical layer reference signal during wireless communication in accordance with the present aspects.

FIG. 3A shows a downlink frame structure 300 used in LTE, which may be used in sending communications from reference signal generation component 470 (FIG. 4) to reference signal identification component 320. The transmission timeline for the downlink may be partitioned into units of radio frames 302, 304. Each radio frame 302 may have a predetermined duration (e.g., 10 milliseconds (ms)) and may be partitioned into 10 subframes 306 with indices of 0 through 9. Each subframe may include two slots, e.g., slots 308, 310. Each radio frame 302, 304 may thus include 20 slots with indices of 0 through 19. Each slot may include L symbol periods, e.g., 7 symbol periods 212 for a normal cyclic prefix (CP), as shown in FIG. 3A, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, the access point (referred to as an evolved node B (eNB)), which may correspond to network entity 404 including reference signal generation component 470 (FIG. 4), may transmit a discovery reference signal (DRS). The DRS may include a Primary Synchronization Signal (PSS) and a Secondary Synchronization Signal (SSS), which may be unique for each cell. In an aspect, for example, the primary and secondary synchronization signals may be transmitted in symbol periods 6 and 5, respectively, in each subframe that includes a DRS. For example, as shown in FIG. 3A, subframes 0 and 5 with the normal cyclic prefix may include at least some physical reference signals of the DRS (e.g., the synchronization signals, PSS and SSS). The synchronization signals may be used by the access terminals (referred to as UEs) for cell detection and acquisition. For example, an UE may use the synchronization signals as part of measurements during a cell detection and/or cell selection process. The eNB may also send a cell-specific reference signal (CRS). For example, the CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may also send other signals, such as a Physical Broadcast Channel (PBCH) in symbol periods 0 to 3 in slot 1 of subframe 0, and a Physical Control Format Indicator Channel (PCFICH). In an aspect, the eNB may send the PCFICH in only a portion of the first symbol period of each subframe, although depicted in the entire first symbol period in FIG. 3A. The eNB may also send a Physical HARQ Indicator Channel (PHICH) and a Physical Downlink Control Channel (PDCCH) in the first M symbol periods of each subframe (M=3 in FIG. 3A). The eNB may also send a Physical Downlink Shared Channel (PDSCH) in the remaining symbol periods of each subframe. The various signals and channels in LTE are described in 3GPP TS 36.211, entitled "Evolved Universal Terrestrial Radio Access (E-UTRA); Physical Channels and Modulation," which is publicly available and incorporated by reference in its entirety. Further, 3GPP publications 3GPP TS 36.212, 36.213, and 36.331 are also publicly available and incorporated by reference in their entireties.

In an aspect, the eNB may send the PSS, SSS and PBCH in the center 1.08 MHz of the system bandwidth used by the eNB. In an aspect, the bandwidth used to transmit the PSS, SSS, and/or PBCH may be expanded to use up to the entire system bandwidth. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search (e.g., the common search space or the UE-specific search space). A UE may be within the coverage of multiple eNBs. One of these eNBs may be selected to serve the UE, and may also be referred to as the primary cell (Pcell). The serving eNB may be selected based on various criteria such as received power, path loss, signal-to-noise ratio (SNR), etc.

Figure 3B:
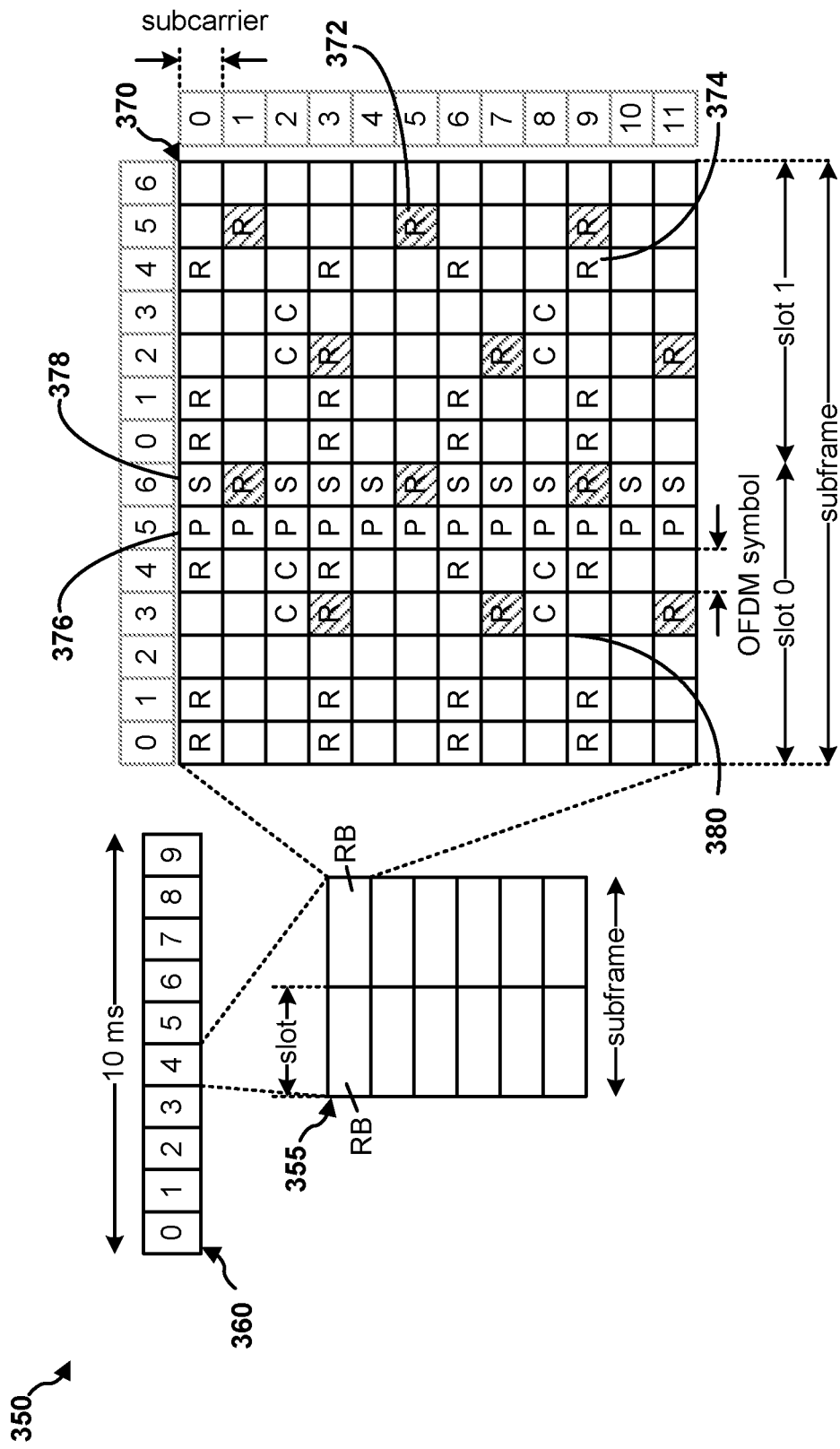
FIG. 3B is a diagram illustrating another example of a downlink frame structure in LTE according to the present aspects.

FIG. 3B is a diagram 350 illustrating another example of a downlink (DL) frame structure 360 in LTE. A frame (10 ms) may be divided into 10 equally sized subframes 365. Each subframe 365 may include two consecutive time slots. A resource grid 370 may be used to represent two time slots, each time slot including a resource block. The resource grid 370 is divided into multiple resource elements (REs). Some of the resource elements, indicated as R 372, 374, include DL reference signals (DL-RS). The DL-RS may include cell-specific RS (CRS) (also sometimes called common RS) 372 and UE-specific RS (UE-RS) 374. UE-RS 374 is transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In subframes where the DRS is transmitted, resource grid 370 may also include resource elements for the DRS. For example, the resource grid 370 may include resource elements for a PSS (P) 376, SSS (S) 378, and CSI-RS (C) 380. In an aspect, the elements for transmitting the DRS may be unavailable for transmitting a transport block for the UE on the PDSCH. Accordingly, the transport block may be rate-matched around the DRS, as well as the DL-RS. In an aspect, an eNB may signal which subframes include the DRS so the UE can appropriately rate match the received transmission in those subframes. In an aspect, the eSIB may be transmitted on the PDSCH by rate-matching the eSIB around resource elements of the DRS such as the CSI-RS.

FIG. 4 is a block diagram conceptually illustrating an example of a wireless communication system 400 in accordance with an aspect of the present disclosure, wherein respective components operate to enable a UE or access terminal to perform measurements regarding an eNodeB or access point when the UE or access terminal is operating in a license assisted access (LAA) mode and/or carrier aggregation mode in an unlicensed frequency spectrum. Wireless communication system 400 may include one or more network entities 404, for example, one or more evolved NodeBs (eNodeBs) communicating with one or more UEs, such as UE 402, via one or more communication channels 408 and/or 410.

In an aspect, each network entity 404 may be an example of access point 106 (FIG. 1), and UE 402 may be an example of access terminal 102. Each network entity 404 may include reference signal generation component 470, which may be configured to transmit one or more transmissions including a discovery reference signal over an unlicensed radio frequency spectrum to a UE, such as UE 402. UE 402 may be configured with reference signal identification component 420 to monitor for the one or more discovery reference signals. For example, in an aspect, the reference signal may include, but is not limited to, a transmitted signal on a physical channel configured to provide information to the UE 402 to connect with network entity 404. Further, for example, in an aspect, the reference signal may include PSS, SSS, CRS, CSI-RS, CSI-IM, and/or an eSIB. In some aspects, the DRS may be transmitted and/or received during different subframes of a discovery window, or in other aspects, outside of the discovery window.

In some aspect, UE 402 may include a memory 422, one or more processors 424 and a transceiver 426. The memory, one or more processors 424 and the transceiver 426 may communicate internally via a bus 438. In some examples, the memory 422 and the one or more processors 424 may be part of the same hardware component (e.g., may be part of a same board, module, or integrated circuit). Alternatively, the memory 422 and the one or more processors 424 may be separate components that may act in conjunction with one another. In some aspects, the bus 438 may be a communication system that transfers data between multiple components and subcomponents of the UE 402. In some examples, the one or more processors 424 may include any one or combination of modem processor, baseband processor, digital signal processor and/or transmit processor. Additionally or alternatively, the one or more processors 424 may include reference signal identification component 420 for carrying out one or more methods or procedures described herein. The reference signal identification component 420 may comprise hardware, firmware, and/or software and may be configured to execute code or perform instructions stored in a memory (e.g., a computer-readable storage medium).

In some examples, the UE 402 may include the memory 422, such as for storing data used herein and/or local versions of applications or communication with reference signal identification component 420 and/or one or more of its subcomponents being executed by the one or more processors 424. Memory 422 can include any type of computer-readable medium usable by a computer or the one or more processors 424, such as random access memory (RAM), read only memory (ROM), tapes, magnetic discs, optical discs, volatile memory, non-volatile memory, and any combination thereof. In an aspect, for example, memory 422 may be a computer-readable storage medium (e.g., a non-transitory medium) that stores one or more computer-executable codes defining reference signal identification component 420 and/or one or more of its subcomponents, and/or data associated therewith, when UE 402 is operating the one or more processors 424 to execute reference signal identification component 420 and/or one or more of its subcomponents.

In some examples, the UE 402 may further include a transceiver 426 for transmitting and/or receiving one or more data and control signals to/from the network via the one or more network entities 404. The transceiver 426 may comprise hardware, firmware, and/or software and may be configured to execute code or perform instructions stored in a memory (e.g., a computer-readable storage medium). The transceiver 426 may include a 1st RAT radio 428 comprising a modem 430, and a 2nd RAT radio 432 (e.g., LTE radio) comprising a modem 434. The 1st RAT radio 428 and 2nd RAT radio 432 may utilize one or more antennas 436a-b for transmitting signals to and receiving signals from the one or more network entities 404. In an example, 1st RAT radio 428 may be associated with a wireless local area network (WLAN) and 2nd RAT radio 432 may be associated with a wireless wide area network (WWAN) over unlicensed spectrum.

Reference signal identification component 420 may include relative position determination component 440, which may be configured to determine a relative position of a received subframe with respect to a discovery window. For example, UE 402 may receive, via transceiver 426, a DRS in a received subframe on communications channel 410. In some aspects, the transmitted subframe of the DRS may be unknown to UE 402. Relative position determination component 440 may be configured to determine a relative position of the received subframe with respect to a discovery window. For example, relative position determination component 440 may determine, based on the received subframe relative to a discovery window for the DRS, whether the DRS was transmitted in a first portion, a second portion, or outside of the discovery window (e.g., the discovery window may be a DRS measurement timing configuration window the size of one radio frame 202).

In an aspect, reference signal identification component 420 may include scrambling sequence selection component 442, which may be configured to select a scrambling sequence to use for descrambling the received DRS based on the relative position of the received subframe with respect to the discovery window, rather than based on a specific subframe. For example, reference signal generation component 470 of the one or more network entities 404 may be configured to generally transmit a scrambled DRS according to one of a group of different scrambling sequences that each correspond to a different portion of transmitted subframes (also referred to as subframe indexes). UE 402 may select a specific scrambling sequence based on the relative position of the subframe including the DRS relative to the discovery window.

For example, when the received subframe of the DRS was in one of subframe 0, 1, 2, 3, or 4, UE 402, via relative position determination component 440, may determine that the DRS carries a preamble pattern. Further, for example, when the received subframe of the DRS was in one of subframe 5, 6, 7, 8, or 9, UE 402 may, via relative position determination component 440, determine that the DRS carries a midamble pattern. In such instances, in lieu of determining the specific subframe index to identify a specific scrambling sequence, UE 402, via relative position determination component 440, may simply determine whether the subframe was in a first portion (in one of subframes 0-4) or in a second portion (in one of subframes 5-9) of the subframes received in the discovery window. Then, UE 402 may, via scrambling sequence selection component 442, be configured to select a scrambling sequence identified for use when transmitting DRS in either the first portion or the second portion of subframes. In an aspect, the scrambling sequence for the first or second portion may be included in the first subframe of the portion (e.g., subframe 0 for the first portion, subframe 5 for the second portion). In an aspect, UE 402 may, via relative position determination component 440, determine that the relative position of the DRS within any of subframes 0, 1, 2, 3, 4, 6, 7, 8, 9 within the discovery window. UE 402 may then choose a scrambling sequence corresponds to subframe 0.

For example, if a DRS was received by UE 402 in subframe 2, UE 402 may, via relative position determination component 440, determine that the DRS was transmitted in a first portion of subframes associated with the discovery window, and may, via scrambling sequence selection component 442, select the scrambling sequence known to be associated with the first portion, such as but not limited to a scrambling sequence corresponding to subframe 0. Similarly, if a DRS was received by UE 402 in subframe 8, UE 402 may, via relative position determination component 440, determine that the DRS was received in a second portion any may, via scrambling sequence selection component 442, select the scrambling sequence included in subframe 5. In an aspect, the DRS may be received in a subframe outside of the discovery window. In such instances, UE 402 may determine the actual subframe number.

In another aspect, reference signal identification component 420 may include channel state determination component 444, which may be configured to determine channel state information (CSI) resources based on a received reference signal. In an aspect, for example, UE 402 may receive a DRS in the form of a cell-specific resource signal (CRS). UE 402 may use relative position determination component 440 to determine the relative position of the CRS in relation to the discovery window. UE 402 may, in an aspect, use channel state determination component 444 to determine whether CSI resources are present. In an aspect, the determination may be based on the relative position of the subframe including the CRS in relation to the discovery window.

For example, UE 402 may use CSI-RS resources for different processes, such as for periodic CSI-RS transmission configuration, for radio resource management (RRM) measurements, and/or, for channel estimates. In an aspect, the CSI-RS resources may be configured for each of these processes independently. In order to avoid collisions, UE 402 and/or network entity 404 may restrict the processes that by access and/or use the CSI-RS resources. For example, UE 402 may be restricted to use CSI-RS for only one of RRM measurements or channel determinations (e.g., channel measurements for determining a channel quality indicator (CQI), channel estimates, and/or determining reference signal received power (RSRP)). In an aspect, UE 402 may also use the CSI-RS for channel state information when processing a DRS (e.g., a CRS). In such instances, the CSI-RS resources used for the DRS and for other processes (e.g., RRM measurement, etc.) may be identical. In an aspect, this may prevent UE 402 from configuring CSI-RS resources using the last two symbols in a subframe.

When the CSI-RS is configured as part of periodic CSI-RS transmissions, it may occur periodically subject to listen-before-talk (LBT). When receiving the subframe carrying the CRS and (CSI-RS), the UE 402 may determine the relative position of the subframe in relation to a discovery window. When UE 402 determines that the subframe is outside of the receiving window and is a full subframe, UE 402 may also attempt to determine whether the subframe is a valid downlink subframe.

In an aspect, UE 402 may be expected to monitor only one of several CSI resources present within the DMTC window or within the DRS subframe. This may occur when UE 402 is configured with CSI-RS as part of the DRS.

In an aspect UE 402 may be provided a timing relaxation for CSI processing and reporting periodic and aperiodic CQI. In another aspect, network entity 404 may configure Physical Uplink Shared Channel (PUSCH) or Physical Uplink Control Channel (PUCCH) resources with a timing relaxation. This may occur for only reporting CSI based on CSI processing resources present in the DRS. In an aspect, RRC signaling can provide the CSI configuration; in another aspect, the CSI configuration may be included as part of a UL grant carrying an aperiodic CSI request.

When the determination is made that the subframe is a valid DL subframe, UE 402 may determine that the CSI-RS and CSI interference management (CSI-IM) information are included in that subframe. UE 402 may use the information included in the subframe to configure the CSI-RS received. Similarly, when UE 402 determines that the subframe is an initial-part subframe (e.g., a subframe in the first portion of a discovery window) or an end-part subframe (e.g., a subframe in the second portion of a discovery window), UE 402 may determine other information. For example, for an initial-part subframe, UE 402 may determine whether the CSI-RS and/or CSI-IM resources are present in the subframe based on how the subframes are defined. For an end-part subframe, UE 402 may determine the presences of CSI-RS and/or CSI-IM information based on downlink pilot time slot (DwPTS) configuration. In an aspect, the time and frequency location of CSI-RS and/or CSI-IM information within the subframe depends on the configuration type of the partial subframe.

Moreover, for example, communications system 400 may be an LTE network. Communications system 400 may include a number of evolved NodeBs (eNodeBs) (e.g., network entity 404) and UEs 402 and other network entities. An eNodeB may be a station that communicates with the UEs 402 and may also be referred to as a base station, an access point, etc. A NodeB is another example of a station that communicates with the UEs 402. Each eNodeB (e.g., network entity 404) may provide communication coverage for a particular geographic area. In 3GPP, the term "cell" can refer to a coverage area of an eNodeB and/or an eNodeB subsystem serving the coverage area, depending on the context in which the term is used.

An eNodeB (e.g., network entity 404) may provide communication coverage for a small cell and/or other types of cell. The term "small cell" (or "small coverage cell"), as used herein, may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. An eNodeB for a macro cell may be referred to as a macro eNodeB. An eNodeB for a pico cell may be referred to as a pico eNodeB. An eNodeB for a femto cell may be referred to as a femto eNodeB or a home eNodeB.

The UEs 402 may be dispersed throughout the telecommunications network system 400, and each UE 402 may be stationary or mobile. For example, the UE 402 may be referred to as a terminal, a mobile station, a subscriber unit, a station, etc. In another example, the UE 402 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 402 may be able to communicate with macro eNodeBs, pico eNodeBs, femto eNodeBs, relays, etc. For example, in FIG. 4, transmissions may occur between a UE 402 and a serving eNodeB (e.g., network entity 404), which is an eNodeB designated to serve the UE 402 on the downlink and/or uplink.

In a non-limiting use case, for example, the transmission of signals in the DRS (PSS/SSS/CSI-RS) may be made within the outside the DMTC window. Specifically, in some aspects, for every subframe 0 and 5, when transmitted by the eNB (e.g., at least one of network entities 404), may contain a PSS/SSS/CRS where the PSS/SSS/CRS in the LSS DRS is a subset of these signals. In some aspects, a number of CRS ports may be the same or higher than a number of CRS ports in the DRS. Further, in some aspects, a partial transmission time interval (TTI) (e.g., The minimum time between MAC protocol data units (PDUs) being passed down to the physical layer) may be in subframe 0 and 5. Additionally, in some aspects, UE 402 may be configured to detect and/or measure cells (e.g., of network entity 404) transmitting DRS during the configured DRS DMTC window.

In some aspects, the PSS/SSS/CRS in LAA DRS may be a subset of PSS/SSS/CRS. In addition, CSI-RS may be transmitted as part of the DRS for the purpose of channel estimation to compute CQI. UE 402 may be configured with DRS and CSI-RS in the same subframe, for the purpose of CSI channel measurement using the configured CSI-RS.

Further, in some aspects, UE 402 may assume CRS ports are transmitted during a DRS occasion for the purpose of CSI measurement (e.g., dependent on DRS design/structure). As such, scrambling sequences for the above reference signals may be determined for LAA. In addition, collisions between CSI-RS transmissions as part of DRS may be resolved for channel measurement, RSRP and periodic CSI-RS.

With respect to PSS/SSS/CRS/CSI-RS scrambling, UE 402 may be configured with LAA SCells, where the timing of the SCell may be derived from the timing of the PCell through the CA framework. Thus, for a serving SCell, the scrambling sequences used in each subframe may be determined using this relationship. A factor in imposing restrictions on the choice of scrambling sequences arises from the desire to perform neighbor cell measurements from other LAA transmitters belonging to either the serving PLMN or a neighboring PLMN.

In LAA, the DRS can "float" within the DMTC, i.e., it may occur in one of several subframe candidate positions within the DMTC. To enable UE 402 to perform RRM measurements on a neighboring cell, a number of choices of scrambling for the PSS/SSS may be used. Initially, for example, PSS/SSS may be transmitted as part of DRS in subframes 0, 1, 2, 3 and 4 of a radio frame carries the preamble pattern. Further, for instance, PSS/SSS may be transmitted as part of DRS in subframes 5, 6, 7, 8 and 9 of a radio frame carries the midamble pattern. Additionally, for example, PSS/SSS may be transmitted outside the DMTC pattern may follow Rel-12 structure.

Moreover, in some aspects, once the UE 402 detects a PSS/SSS, it may be configured to determine that the subframe in which DRS was transmitted was either one of subframes 0, 1, 2, 3 or 4 (when a preamble type is detected) or one of subframes 5, 6, 7, 8 or 9 (when a midamble type is detected). In some aspects, for the purpose of RRM measurement and determining PLMN ID etc., the UE 402 may be configured to determine the exact scrambling sequence to be used for CRS and CSI-RS processing. If the scrambling sequences in subframes within the DMTC are determined the exact subframe index, the UE 402 may test several hypothesis (at least 5) for the scrambling sequences to determine the exact scrambling sequence used in that subframe. This may result in significantly increased detection complexity and corrupted measurements due to misdetection and false alarms at the UE 402.

In some aspects, to reduce UE 402 implementation complexity and improve reliability, for the DRS within the DMTC for CRS and CSI-RS transmissions, at least one of the following scrambling schemes may be utilized: use SF #0 scrambling in actual subframes SF #0, SF #1, SF #2, SF #3 and SF #4, use SF #5 scrambling in actual subframes SF #5, SF #6, SF #7, SF #8 and SF #9, or UE-specific reference signal (UERS) scrambling. Further, for transmissions outside the DMTC, scrambling of all sequences may be based on the actual subframe number. Note that PSS/SSS transmissions outside the DMTC may occur only in subframes 0 and 5.

Such scrambling schemes ensure that whether UE 402 detects a PSS/SSS transmission of a (either synchronous or asynchronous) neighbor cell within the DMTC, the scrambling of the CRS and CSI-RS sequences in that subframe may be determined by determining whether the PSS/SSS transmission was preamble based (SF #0) or midamble based (SF #5). This may simplify the measurement procedure for neighbor cells without significantly increasing UE 402 computational complexity and degrading reliability of measurements.

For a neighbor cell (e.g., of network entity 404), the UE 402 may determine that if CSI-RS for RSRP is configured, presence of CRS may also indicate the presence of CSI-RS resources. The UE 402 may determine the scrambling for the CSI-RS resources from the CRS resources. For measurement of highly asynchronous neighbors whose actual DRS transmission does not occur within the UE's DMTC, assuming the presence of CSI-RS may not be valid as the PSS/SSS transmission may not be part of the DMTC. In such scenarios, it should be assumed that the eNB (e.g., network entity 404) configures the UE 4020 correctly or may be prepared to deal with inaccurate RSRP measurements using CSI-RS.

With respect to control and data transmission within DMTC, in some aspects, UE 402 may have a data path and a "narrowband" searcher path. The data path implementation may be used for control and data channel demodulation, CSI feedback and various other functions such as time/frequency synchronization etc. and may assume that all the reference signals in a given subframe are scrambled according to the subframe number, while the searcher path may handle cells which are out of timing sync (for the purpose of FFT) with the serving cell. The searcher path may be configured more dynamically without significantly impacting existing UE 402 implementation.

As such, different scrambling may be used in subframes 1, 2, 3, 4 and 6, 7, 8, 9 if they are part of the DMTC which can create implementation difficulties along the data path of the UE 402. To avoid sequence scrambling confusion and reduce implementation complexity, the UE 402 may demodulate control and data channels in those subframes where CRS scrambling is consistent with the actual subframe index.

With regard to CSI-RS/CSI-IM configurations, scrambling and UE 402 behavior for LAA, three independent CSI-RS "resources" may be configured for LAA, with one being CSI-RS as part of periodic CSI-RS transmission configuration, another being CSI-RS as part of DRS for RRM measurement, and the last being CSI-RS as part of DRS for channel estimates. In some aspects, collision scenarios may be experienced between the three different CSI-RS configurations and as such, specific scrambling sequences may be used for CSI-RS in each transmission instance.

In some aspects, the CSI-RS configured as part of periodic CSI-RS transmission may occur periodically subject to listen before talk (LBT). The UE 402 may handle a number of scenarios for a subframe carrying CSI-RS. For example, in some aspects related to a subframe being outside DMTC and is a full subframe, if CRS is detected in symbol 0 or if the UE 402 through knowledge of DL-UL configuration or any other means knows that the current subframe is a valid DL subframe, then the UE may determine that CSI-RS and CSI-IM occur in that subframe. Further, for instance, when a subframe is an end partial subframe, if CRS is detected in symbol 0 and signalling is present to indicate an end partial subframe, then UE 402 may determine CSI-RS presence as determined by the DwPTS configuration. In some aspects, for FD-MIMO, zero power (ZP) and non-zero power (NZP-CSI-RS) may be introduced in DwPTS. One of a group of reference resources should be assumed for CSI-IM. Additionally, there may be processing time relaxation for computing CQI, as the UE 402 may determine the type of DwPTS configuration before using it for computing CQI.

Further, for instance, when the subframe is an initial partial subframe, UE 402 may process CSI in a number of ways depending on how the initial partial subframe is defined. In some aspects, if the initial partial subframe, is a shifted version of DwPTS (or the first slot of a subframe), UE 402 may determine the presence of CSI-RS/CSI-IM resources as per DwPTS configuration. In some aspects, if the initial partial subframe is the second slot of a full subframe, UE 402 may determine the presence of CSI-RS/CSI-IM resources if they are configured to occur within the second slot of a subframe and outside of the PDCCH region of the initial partial subframe. In some aspects, no CSI-RS/CSI-IM resources may be transmitted in initial partial subframes and UE 402 need not rate match around such resources for EPDCCH/PDSCH demodulation.

Further, when the subframe is within DMTC and is a DRS subframe, there may be uncertainty at the UE 402 due to collision of CSI resources with PSS/SSS and also if the resources are configured to be in the last two symbols in the subframe. UE 402 may utilize signalling to determine whether CSI-RS/CSI-IM resources as part of periodic CSI-RS transmission are present in the current subframe. This information may also be used for EPDCCH/PDSCH rate matching at the UE 402 if that subframe contains PDSCH. The UE 402 may receive signalling as CRS scrambling that may not be consistent with subframe number.

In addition, in some aspects, different CSI-RS may be configured as part of the DRS for channel estimation for CQI and RRM measurements. In some scenarios, there may be collision between one or more CSI-RS configurations for UE 402, especially if the CSI-RS as part of the DRS is floating within the DMTC. To enable configuration and management of CSI-RS processing as part of the DRS, CSI-RS as part of DRS may be restricted for LAA SCells.

For instance, with respect to CSI-RS configuration as part of DRS, for UE 402 and a serving cell (e.g., of network entity 404), one of CSI-RS for RRM or CSI-RS for channel measurement for CQI may be configured as part of the DRS. Alternatively, the same set of resources may be used for both CSI-RS for RSRP and for channel estimation for computing CQI. For example, a subset of resources configured for computing CQI may be used for computing CSI-RS based RRM.

Additionally, CSI-RS configured as part of DRS may be used for computing CQI for periodic and aperiodic reporting and hence the configuration of the ports of CSI-RS as part of DRS may be identical (or at least compatible) with the ports of CSI-RS as part of periodic CSI-RS transmission. For UE 402 processing, the CSI-RS configuration may be restricted in a number of ways. For example, in some aspects, if both CSI-RS for CSI in DRS and periodic CSI-RS resources are configured for a UE 402, then their resource configuration must be identical. This implies that periodic CSI-RS resources may not be configured in the last 2 OFDM symbols in a subframe. Further, in some aspects, if both CSI-RS for CSI in DRS and periodic CSI-RS resources are configured for UE 402 and their configuration is not identical, then UE 402 may not be expected to process periodic CSI-RS for CQI within the DMTC and relies only on the CSI-RS as part of DRS if both CSI-RS for CQI and CSI-RS in DRS can occur within the DMTC. To facilitate this and reduce the CSI processing load at UE 402 during the DMTC, CSI-RS in DRS may be used only for channel measurements and only for periodic and aperiodic reports occurring at least 4 ms after the last subframe of the DMTC.

Figure 5:
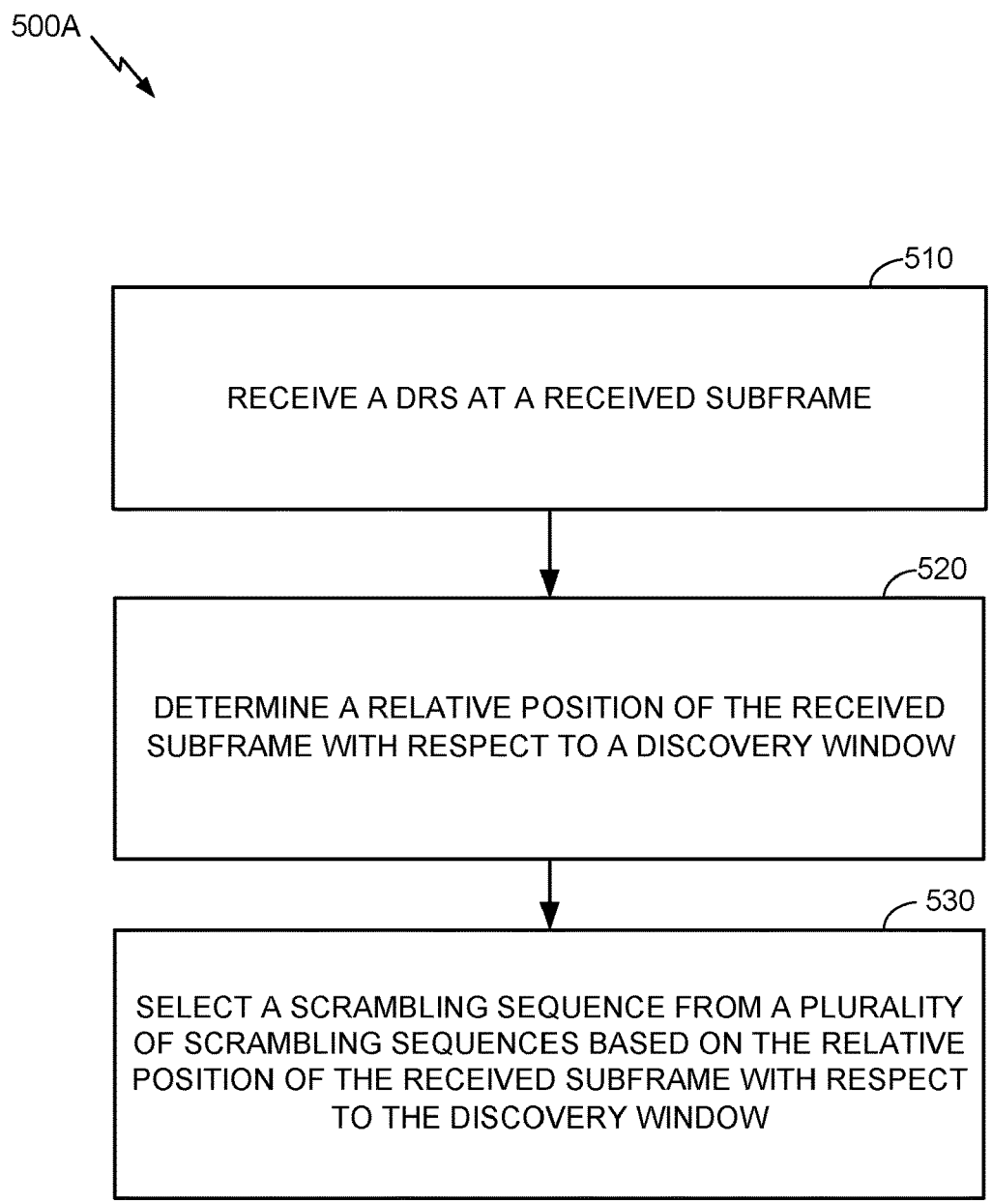
FIG. 5 is a flow diagram illustrating an example method of receiving a physical layer reference signal during wireless communication in accordance with the present aspects.

Referring to FIG. 5, in operation, a UE such as UE 402 (FIG. 4) may perform an aspect of method 500 for communication in a wireless communications network. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 510, method 500 may receive a DRS at a received subframe. For instance, as described herein, UE 402 (FIG. 4) may execute transceiver 426 (FIG. 4) to receive a DRS at a received subframe. In some aspects, the transmitted subframe of the DRS may be unknown. In an aspect, at block 520, method 500 may determine a relative position of the received subframe with respect to a discovery window. For example, as described herein, UE 402 and/or reference signal identification component 420 (FIG. 4) may execute relative position determination component 440 (FIG. 4) to determine a relative position of the received subframe with respect to a discovery window. In an aspect at block 530, method 500 may select a scrambling sequence from a plurality of scrambling sequences based on the relative position of the received subframe with respect to the discovery window. For instance, as described herein, UE 402 and/or reference signal identification component 420 may execute scrambling sequence selection component 442 (FIG. 4) to select a scrambling sequence from a plurality of scrambling sequences based on the relative position of the received subframe with respect to the discovery window.

FIG. 6 illustrates another method 600 for communication in a wireless communications network. In an aspect, at block 610, method 600 may receive a CRS at a received subframe. For example, as described herein, UE 402 (FIG. 4) may execute transceiver 426 (FIG. 4) to receive a CRS at a received subframe. In some aspects, the transmitted subframe of the CRS may be unknown. In an aspect, at block 620, method 600 may determine a relative position of the received subframe with respect to a discovery window. For instance, as described herein, UE 402 and/or reference signal identification component 420 (FIG. 4) may execute relative position determination component 440 to determine a relative position of the received subframe with respect to a discovery window. In an aspect at block 630, method 600 may determine the presence of CSI resources based on the relative position of the received subframe with respect to the discovery window. For example, as described herein, UE 402 and/or reference signal identification component 420 may execute channel state determination component 444 to determine the presence of CSI resources based on the relative position of the received subframe with respect to the discovery window.

Figure 7:
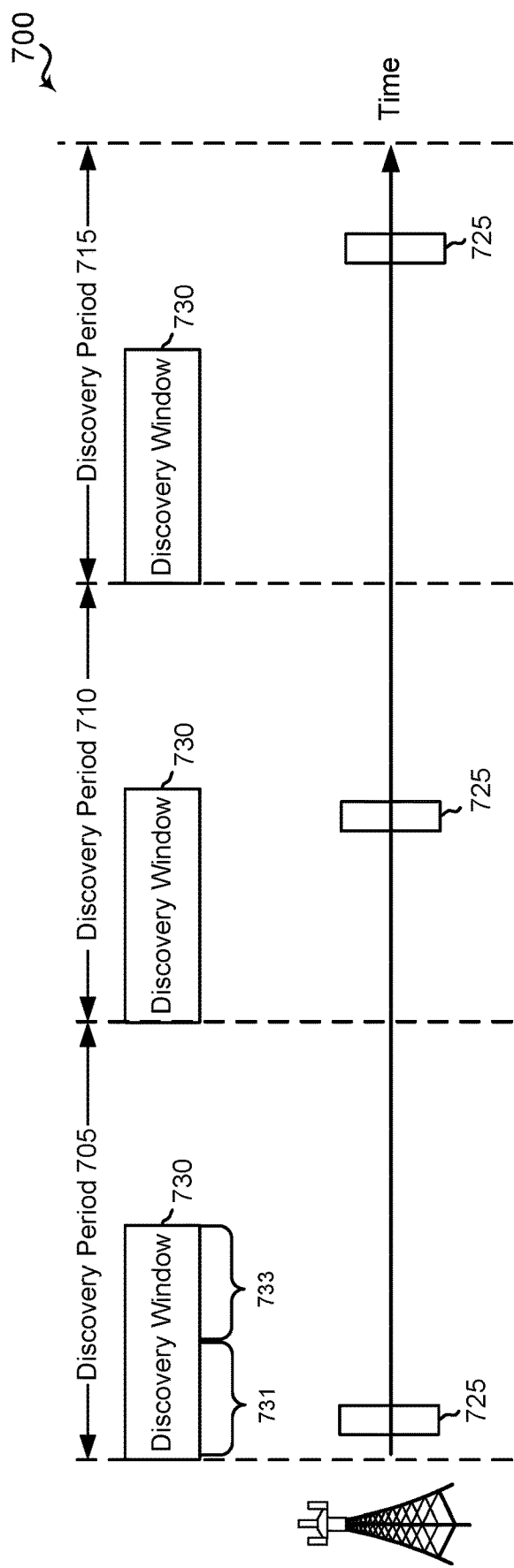
FIG. 7 is a conceptual diagram illustrating an example of transmission of discovery reference signals between the UE and the network entity in accordance with the present aspects.

FIG. 7 shows an example diagram 700 of DRS transmissions 725 made by a network entity over an unlicensed radio frequency spectrum band, in accordance with various aspects of the present disclosure. In an aspect the network entity making DRS transmissions 725 may be an example of aspects of the network entity 404 including reference signal generation component 470, described with reference to FIG. 4. By way of example, FIG. 7 illustrates transmissions over time made by the network entity over time, in three adjacent discovery periods 705, 710, 715. The discovery periods 705, 710, 715 may be determined according to a DMTC.

Discovery window 730 may be provided in each of the discovery periods 705, 710, 715 (e.g., once every N discovery periods (where N>1)) or in one or more discovery periods 705, 710, 715 on a dynamic basis. The length or duration of the discovery window 730 may be shorter or longer than shown. For example, in an aspect, the discovery window 730 may be equal in time to one radio frame 202 (e.g., 10 ms). In an aspect, the discovery window 730 may be a DMTC window.

In some aspects, DRS transmission 725 may be transmitted by the network entity during the discovery window 730 or outside the discovery window 730. In some examples, a transmitted synchronization signal (PSS/SSS) may be used for cell discovery, synchronization, and/or other purposes. In some examples, a transmitted synchronization signal may include a PSS, and/or an SSS. In some aspects, the network entity may attempt to transmit a DRS transmission 725 during the discovery window 730. In some instances, the network entity may transmit one or more DRS transmissions 725 outside of discovery window 730.

In an aspect, each discovery window 730 may include a first portion 731 and a second portion 733. UE 402 may receive a DRS transmission 725 during one of the portions 731, 733 of the discovery window 730 (or outside the discovery window 730). In an aspect, UE 402 may determine whether the subframe including DRS transmission 725 was received in the first portion (e.g., as shown in discovery period 705), the second portion (e.g., as shown in discovery period 710), or outside the discovery window 730 (e.g., as shown in discovery period 715). UE 402 may use reference signal identification component 420 to process the DRS transmission 725 based on the relative position of the received subframe. For example, UE 402 may select a scrambling sequence based on the relative position of the received subframe. In an aspect, UE 402 may also be configured to determine whether the subframe includes CSI-RS and/or CSI-IM information based on the relative position of the subframe.

Figure 8:
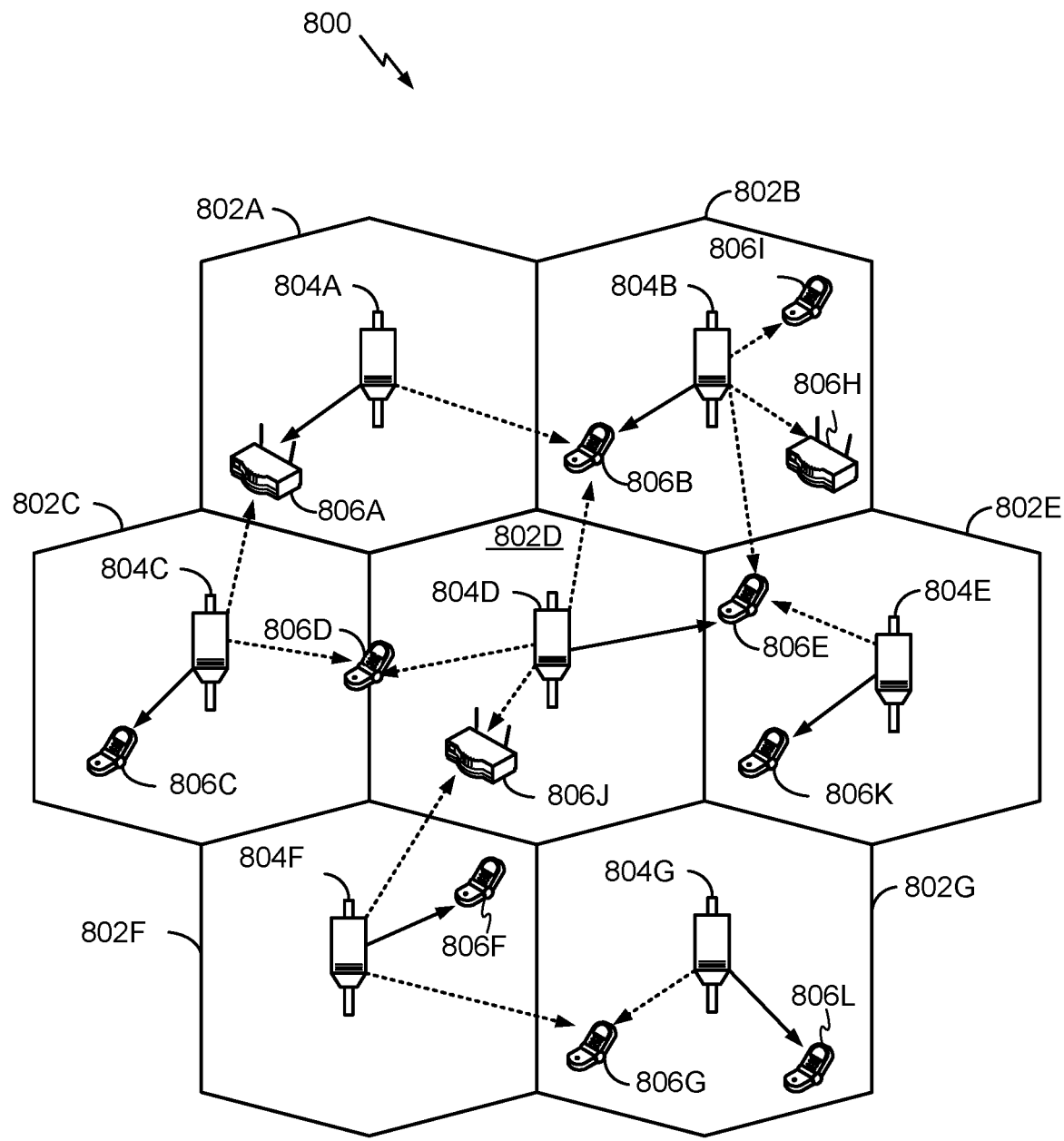
FIG. 8 is a simplified diagram of a wireless communication system in accordance with the present aspects.

FIG. 8 illustrates a wireless communication system 800, configured to support a number of users, including one or more access terminals each including a reference signal identification component 420 and one or more access points each having reference signal generation components 470 that operate to enable the access terminal to receive reference signals from an access point in an unlicensed frequency spectrum. In an aspect, the access terminal may receive reference signals from a neighbor cell and may use the reference signal for configuration and/or scrambling to enable neighbor cell measurements.

The system 800 provides communication for multiple cells 802, such as, for example, macro cells 802A-802G, with each cell being serviced by a corresponding access point 804 (e.g., access points 804A-804G), which may correspond to the access point 106 (FIG. 1) or network entity 404 (FIG. 4) including reference signal generation component 470 (FIG. 4). As shown in FIG. 8, access terminals 806 (e.g., access terminals 806A-806L), which may correspond to access terminal 102 (FIG. 1) or UE 402 (FIG. 4) including reference signal identification component 420 (FIG. 4), may be dispersed at various locations throughout the system over time. Each access terminal 1106 may communicate with one or more access points 1104 on a forward link (FL) and/or a reverse link (RL) at a given moment, depending upon whether the access terminal 806 is active and whether it is in soft handoff, for example. Wireless communication system 800 may provide service over a large geographic region. For example, macro cells 802A-802G may cover a few blocks in a neighborhood or several miles in a rural environment.

Figure 9:
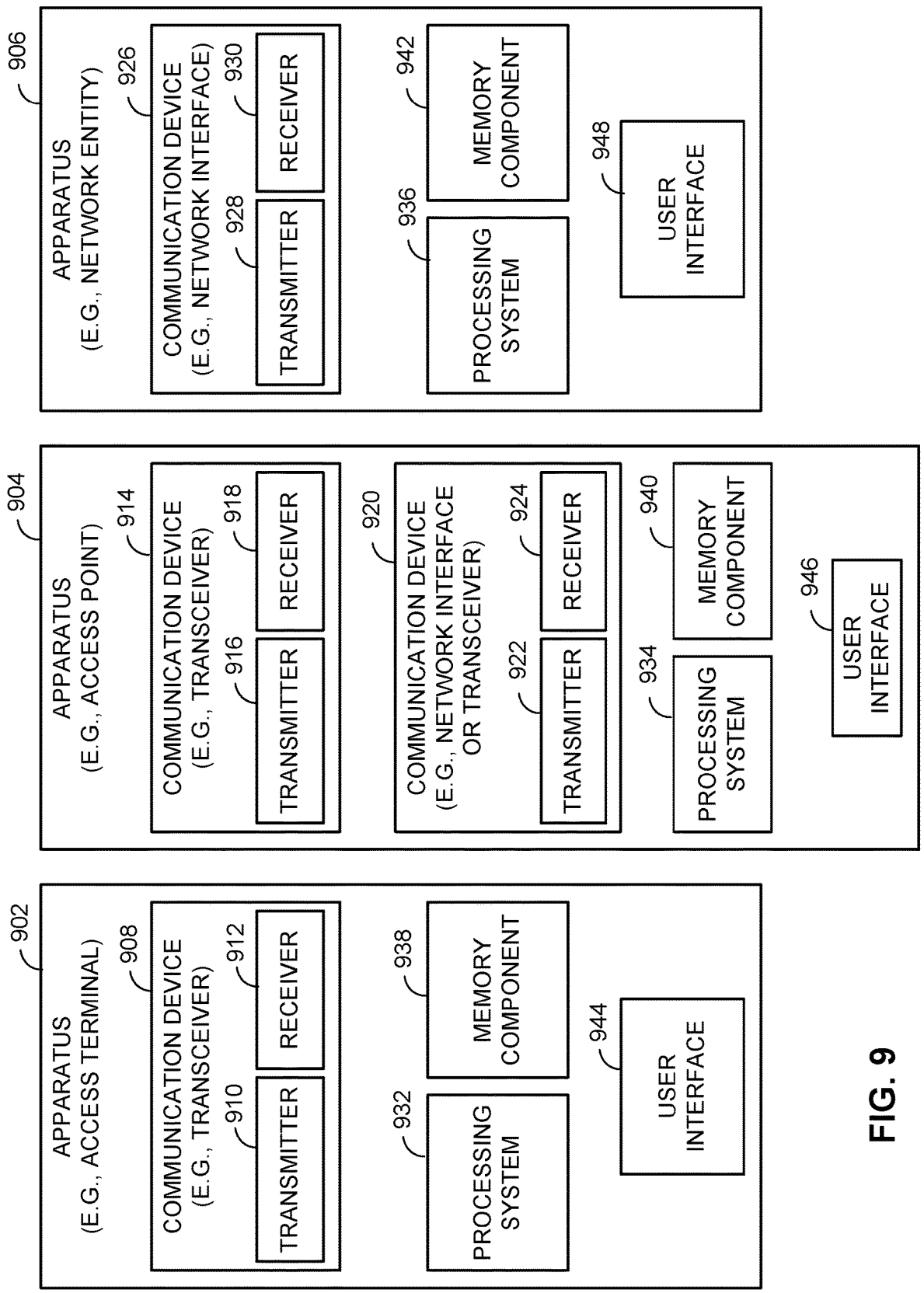
FIG. 9 is a simplified block diagram of example components that may be employed in communication nodes in accordance with the present aspects.

FIG. 9 illustrates several sample components (represented by corresponding blocks) that may be incorporated into an apparatus 902 (e.g., an access terminal), which may correspond to access terminal 102 (FIG. 1) or UE 402 (FIG. 4) including reference signal identification component 420 (FIG. 4), and an apparatus 904 and an apparatus 906 (e.g., an access point 106 (FIG. 1) and a network entity 110 (FIG. 1), respectively), where one or both of which may correspond to network entity 404 including reference signal generation component 470 (FIG. 4), to support operations as taught herein. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

Figure 10:
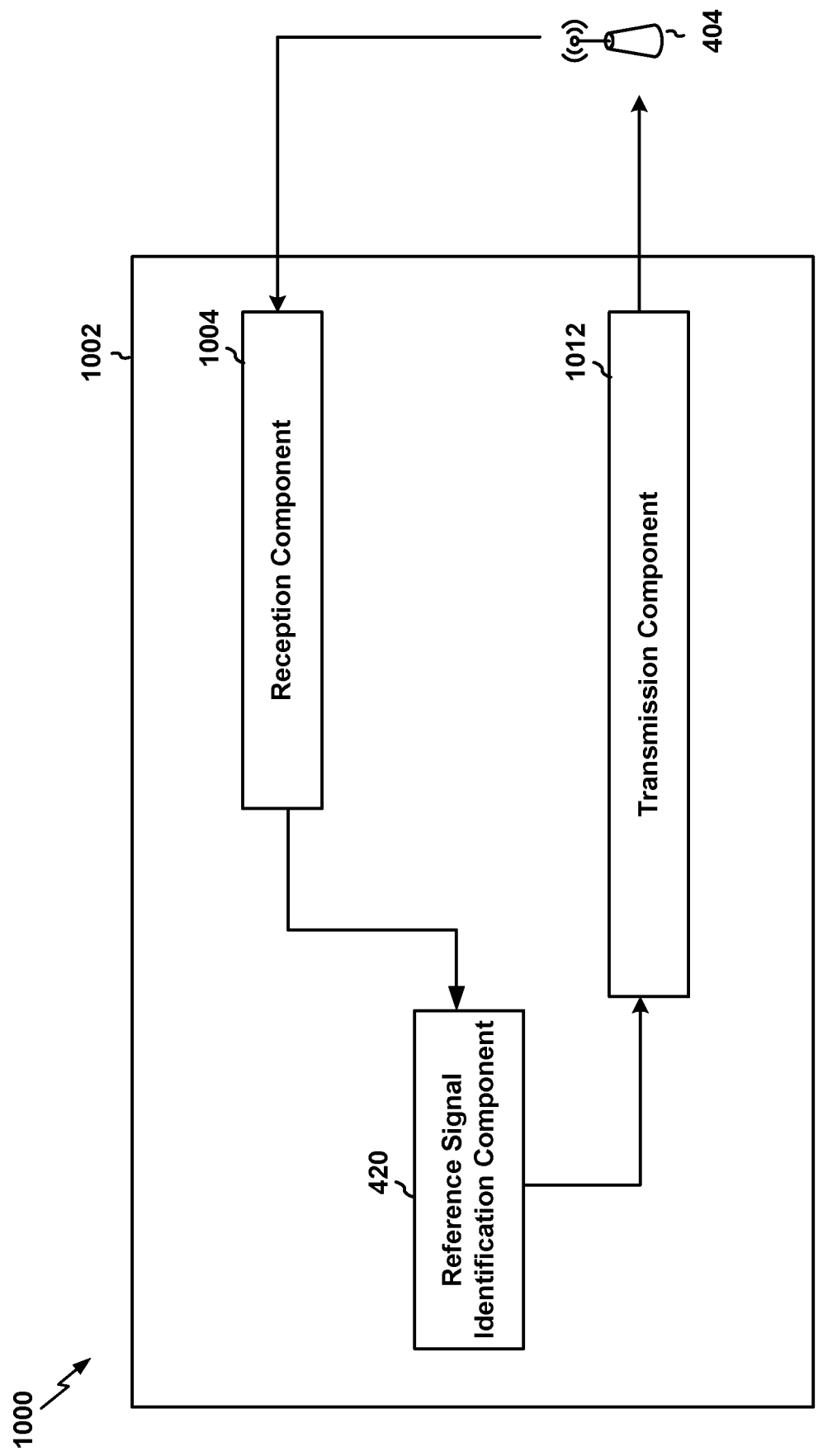
FIG. 10 is a conceptual data flow diagram illustrating the data flow between different means/components in an exemplary apparatus including a frame identifying component in accordance with the present aspects.

FIG. 10 is a conceptual data flow diagram 1000 illustrating the data flow between different means/components in an exemplary apparatus 1002 that includes reference signal identification component 420. The apparatus 1002 may be a UE, for example, UE 402 of FIG. 4. The apparatus 1002 includes reception component 1004 that, in an aspect, receives a DRS at a received subframe. Further, in some aspects, reception component 1004 may receive a CRS at a received subframe. In some aspects, the transmitted subframe of one or both of the DRS or CRS may be unknown. The apparatus 1002 includes reference signal identification component 420 that determines a relative position of the received subframe with respect to a discovery window, and selects a scrambling sequence from a plurality of scrambling sequences based on the relative position of the received subframe with respect to the discovery window. Further, reference signal identification component 420 may determine a relative position of the received subframe with respect to a discovery window and determine the presence of channel state information (CSI) resources based on the relative position of the received subframe with respect to the discovery window In an aspect, the apparatus 1002 further includes transmission component 1012 that transmits one or more signals to at least one of the one or more base stations.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
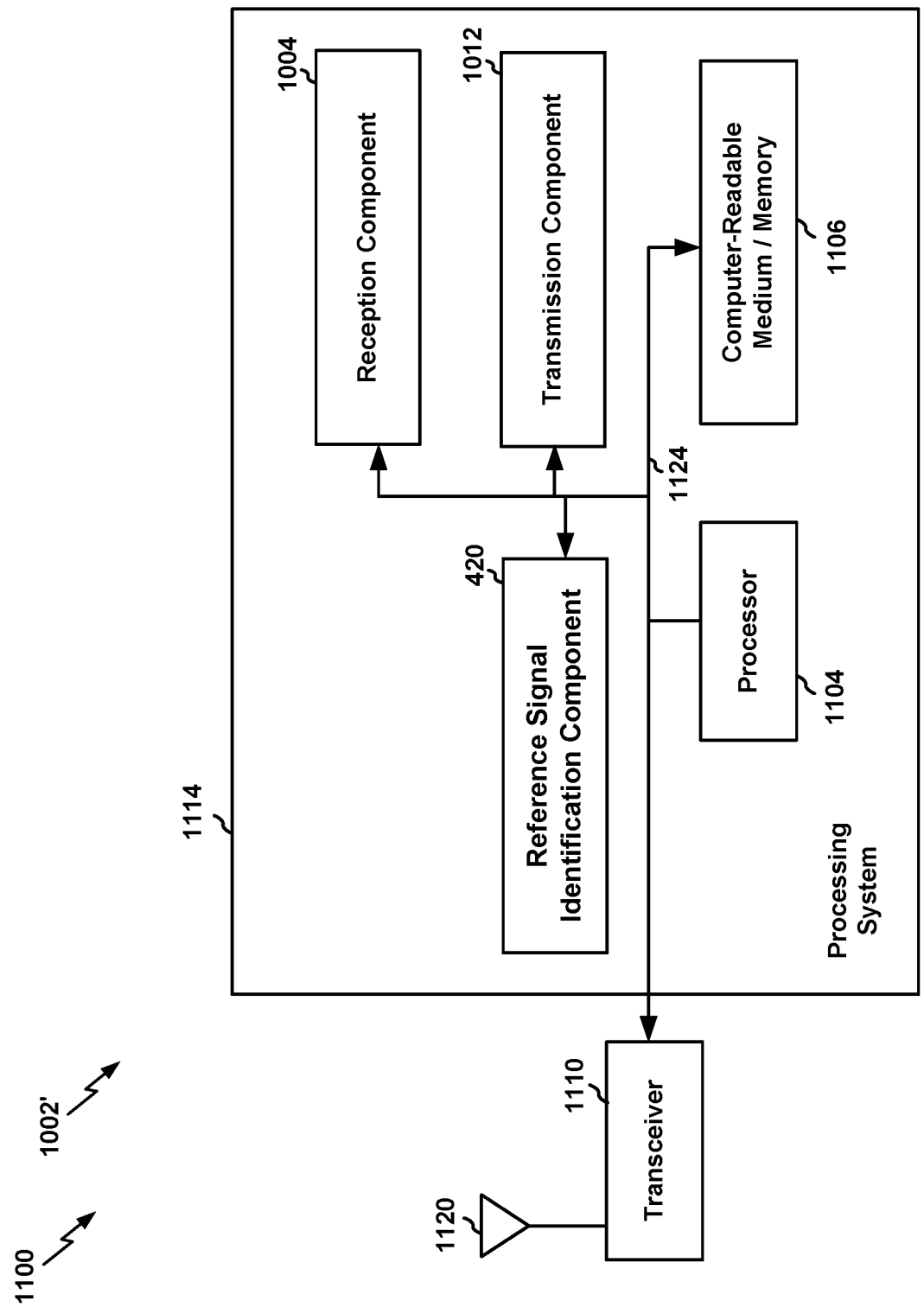
FIG. 11 is a diagram illustrating an example of a hardware implementation for an apparatus employing a processing system including a frame identifying component in accordance with the present aspects.

FIG. 11 is a diagram 1100 illustrating an example of a hardware implementation for an apparatus 1002' employing a processing system 1114 that includes reference signal identification component 420. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, which may be the same as or similar to processor(s) 424

(FIG. 4), the components 1004, 1012, and the computer-readable medium/memory 1106, which may be the same as or similar to memory 422 (FIG. 4). The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1112, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1010, and 1012. The components may be software components running in the processor 1104, resident/stored in the computer readable medium/memory 1106, one or more hardware components coupled to the processor 1104, or some combination thereof.

In one configuration, the apparatus 1102/1002' for wireless communication includes means for receiving, by a UE, a DRS at a received subframe, where a transmitted subframe of the DRS is unknown. The apparatus further includes means for determining a relative position of the received subframe with respect to a discovery window. Additionally, the apparatus includes means for selecting a scrambling sequence from a plurality of scrambling sequences based on the relative position of the received subframe with respect to the discovery window.

In another configuration, the apparatus 1102/1002' for wireless communication includes means for receiving, by a UE, a CRS at a received subframe, where a transmitted subframe of the CRS is unknown. The apparatus further includes means for determining a relative position of the received subframe with respect to a discovery window. Additionally, the apparatus includes means for determining the presence of channel state information (CSI) resources based on the relative position of the received subframe with respect to the discovery window.

The aforementioned means may be one or more of the aforementioned components of the apparatus 1102 and/or the processing system 1114 of the apparatus 1002' configured to perform the functions recited by the aforementioned means. In some aspects, the processing system 1114 may include the TX Processor 268 (FIG. 2), the RX Processor 256 (FIG. 2), and the controller/processor 259 (FIG. 2). As such, in one configuration, the aforementioned means may be the TX Processor 268 (FIG. 2), the RX Processor 256 (FIG. 2), and the controller/processor 259 (FIG. 2) configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for scheduling a first set of subframes in a frame duration for traffic based at least in part on a first configuration for communications in an unlicensed frequency band; scheduling, based at least in part on the first configuration, a second set of subframes in the frame duration for detection of a primary user of the unlicensed frequency band (e.g., radar detection); and adjusting a number of subframes in the first and second set of subframes based on a second configuration for communications, wherein the second configuration for communications is identified based on a type of primary user being detected (e.g., radar type). Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication in a wireless communications network, comprising:
    receiving, by a user equipment (UE), a discovery reference signal (DRS) at a received subframe from a neighboring cell, wherein a transmitted subframe of the DRS is unknown to the UE;
    determining, by the UE, a relative position of the received subframe from the neighboring cell with respect to a discovery window defined by a DRS measurement timing configuration provided by a serving cell based on a pattern of a secondary synchronization signal of the DRS, wherein the relative position of the received subframe from the neighboring cell falls within one of a full subframe of the discovery window, a first portion of the discovery window associated with a preamble pattern of the DRS, or a second portion of the discovery window subsequent the first portion and associated with a midamble pattern of the DRS, or a subframe outside the discovery window; and
    selecting, by the UE, a scrambling sequence from a plurality of scrambling sequences for descrambling the DRS based on the relative position of the received subframe with respect to one of the full subframe of the discovery window, the first portion of the discovery window, the second portion of the discovery window, or the subframe outside the discovery window.

2. The method of claim 1, wherein determining the relative position of the received subframe with respect to the discovery window comprises:
    determining that a relative position of the DRS comprises any of subframes 0, 1, 2, 3, or 4 within the discovery window corresponding to the first portion of the discovery window, and
    wherein selecting the scrambling sequence comprises selecting one of the plurality of scrambling sequences corresponding to subframe 0.

3. The method of claim 1, wherein determining the relative position of the received subframe with respect to the discovery window comprises:
    determining that a relative position of the DRS comprises any of subframes 5, 6, 7, 8, or 9 within the discovery window corresponding to the second portion of the discovery window, and
    wherein selecting the scrambling sequence comprises selecting one of the plurality of scrambling sequences corresponding to subframe 5.

4. The method of claim 1, wherein determining the relative position of the received subframe with respect to the discovery window comprises:
    determining that a relative position of the DRS at the received subframe comprises any of subframes 6, 7, 8, or 9 within the discovery window corresponding to the full subframe of the discovery window, and
    wherein selecting the scrambling sequence comprises selecting one of the plurality of scrambling sequences corresponding to subframe 0.

5. The method of claim 1, wherein the DRS comprises at least one of:
    a primary synchronization signal (PSS); or
    a secondary synchronization signal (SSS).

6. The method of claim 1, wherein determining the relative position of the received subframe with respect to the discovery window comprises:
    determining that a relative position of the DRS comprises the subframe outside of the discovery window, and
    wherein the selecting the scrambling sequence comprises selecting one of the plurality of scrambling sequences corresponding to one of subframe 0 or subframe 5.

7. The method of claim 1, further comprising:
    determining whether the DRS comprises a cell-specific reference signal (CRS); and
    determining a scrambling of the CRS based on determining that the DRS comprises the CRS and based on the selected scrambling sequence.

8. A method of communication in a wireless communications network, comprising:
    receiving, by a user equipment (UE), a cell-specific reference signal (CRS) at a received subframe from a neighboring cell, wherein a transmitted subframe of the CRS is unknown to the UE;
    determining, by the UE, a relative position of the received subframe from the neighboring cell with respect to a discovery window defined by a DRS measurement timing configuration provided by a serving cell, wherein the relative position of the received subframe from the neighboring cell falls within one of a full subframe, an initial partial subframe of the discovery window associated with a preamble pattern of the DRS, an end partial subframe of the discovery window subsequent the initial partial subframe and associated with a midamble pattern of the DRS, or a subframe outside the discovery window; and
    determining, by the UE, the presence of channel state information (CSI) resources based on the relative position of the received subframe from the neighboring cell with respect to one of the full subframe of the discovery window, the initial partial subframe of the discovery window, the end partial subframe of the discovery window, or the subframe outside the discovery window.

9. The method of claim 8, further comprising:
processing, based on determining that the CSI resources are present, the CSI resources for one of:
radio resource management (RRM) measurement, or
channel measurement for a channel quality indicator (CQI).

10. The method of claim 8, wherein the CSI resources include at least one of:
a CSI reference signal (CSI-RS) information; or
a CSI interference management (CSI-IM) information.

11. The method of claim 10, wherein determining the relative position of the received subframe comprises determining that the received subframe is outside of the discovery window, the method further comprising:
determining whether the received subframe comprises the full subframe, the end partial subframe, or the initial partial subframe, wherein determining the presence of the CSI resources is based on whether the received subframe comprises the full subframe, the end partial subframe, or the initial partial subframe.

12. The method of claim 11, wherein a time and a frequency location of the CSI-RS information and CSI-IM information within the received subframe depend on a configuration or type of the partial subframe.

13. The method of claim 10, wherein determining the relative position of the received subframe comprises determining that the received subframe is inside of the discovery window, the method further comprising:
determining whether the received subframe comprises a discovery reference signal (DRS) subframe, wherein determining the presence of CSI resources is further based on whether the received subframe comprises the DRS subframe.

14. The method of claim 13, further comprising monitoring, at the UE, one of the CSI resources present within a DRS measurement timing configuration (DMTC) window based on a configuration of the CSI-RS information as part of the DRS.

15. The method of claim 13, further comprising monitoring, at the UE, one of the CSI resources present within the DRS subframe based on a configuration of the CSI-RS information as part of the DRS.

16. The method of claim 13, further comprising receiving a timing relaxation for CSI processing and reporting of a periodic and aperiodic CQI request.

17. The method of claim 16, wherein at least one of Physical Uplink Shared Channel (PUSCH) or Physical Uplink Control Channel (PUCCH) resources are configured with the timing relaxation for reporting the CSI resources based on CSI processing of the CSI resources present in the DRS.

18. The method of claim 17, wherein at least one of the configured PUSCH resources or the configured PUCCH resources is received via RRC signaling or as part of an uplink grant carrying the aperiodic CSI request.

19. A user equipment (UE) apparatus for communication in a wireless communications network, comprising:
a memory;
a transceiver configured to receive a discovery reference signal (DRS) at a received subframe from a neighboring cell, wherein a transmitted subframe of the DRS is unknown to the UE; and
a processor coupled to the transceiver and the memory, the processor configured to:
determine a relative position of the received subframe from the neighboring cell with respect to a discovery window defined by a DRS measurement timing configuration provided by a serving cell, wherein the relative position of the received subframe from the neighboring cell falls within one of a full subframe of the discovery window, a first portion of the discovery window associated with a preamble pattern of the DRS, a second portion of the discovery window subsequent the first portion and associated with a midamble pattern of the DRS, or a subframe outside the discovery window; and
select a scrambling sequence from a plurality of scrambling sequences for descrambling the DRS based on the relative position of the received subframe with respect to one of the full subframe of the discovery window, the first portion of the discovery window, the second portion of the discovery window, or the subframe outside the discovery window.

20. The apparatus of claim 19, wherein to determine the relative position of the received subframe with respect to the discovery window, the processor is further configured to:
determine that a relative position of the DRS comprises any of subframes 0, 1, 2, 3, or 4 within the discovery window corresponding to the first portion of the discovery window, and
wherein to select the scrambling sequence, the processor is further configured to select one of the plurality of scrambling sequences corresponding to subframe 0.

21. The apparatus of claim 19, wherein to determine the relative position of the received subframe with respect to the discovery window, the processor is further configured to:
determine that a relative position of the DRS comprises any of subframes 5, 6, 7, 8, or 9 within the discovery window corresponding to the second portion of the discovery window, and
wherein to select the scrambling sequence, the processor is further configured to select one of the plurality of scrambling sequences corresponding to subframe 5.

22. The apparatus of claim 19, wherein to determine the relative position of the received subframe with respect to the discovery window, the processor is further configured to:
determine that a relative position of the DRS at the received subframe comprises any of subframes 6, 7, 8, or 9 within the discovery window corresponding to the full portion of the discovery window, and
wherein select the scrambling sequence, the processor is further configured to select one of the plurality of scrambling sequences corresponding to subframe 0.

23. The apparatus of claim 19, wherein the DRS comprises at least one of:
a primary synchronization signal (PSS); or
a secondary synchronization signal (SSS).

24. The apparatus of claim 19, wherein to determine the relative position of the received subframe with respect to the discovery window, the processor is further configured to:
determine that a relative position of the DRS comprises the subframe outside of the discovery window, and
wherein the selecting the scrambling sequence comprises selecting one of the plurality of scrambling sequences corresponding to one of subframe 0 or subframe 5.

25. A user equipment (UE) apparatus for communication in a wireless communications network, comprising:
a memory;
a transceiver configured to receive a cell-specific reference signal (CRS) at a received subframe from a neighboring cell, wherein a transmitted subframe of the CRS is unknown to the UE; and a processor coupled to the transceiver and the memory, the processor configured to:
- determine a relative position of the received subframe from the neighboring cell with respect to a discovery window defined by a DRS measurement timing configuration provided by a serving cell, wherein the relative position of the received subframe from the neighboring cell falls within one of a full subframe, an initial partial subframe of the discovery window associated with a preamble pattern of the DRS, an end partial subframe of the discovery window subsequent the initial partial subframe and associated with a midamble pattern of the DRS, or a subframe outside the discovery window; and
- determine the presence of channel state information (CSI) resources based on the relative position of the received subframe from the neighboring cell with respect to one of the full subframe of the discovery window, the initial partial subframe of the discovery window, the end partial subframe of the discovery window, or the subframe outside the discovery window.

26. The apparatus of claim 25, wherein the processor is further configured to:
process, based on determining that the CSI resources are present, the CSI resources for one of:
- radio resource management (RRM) measurement, or
- channel measurement for a channel quality indicator (CQI).

27. The apparatus of claim 25, wherein the CSI resources include at least one of:
- a CSI reference signal (CSI-RS) information; or
- a CSI interference management (CSI-IM) information.

28. The apparatus of claim 27, wherein to determine the relative position of the received subframe, the processor is further configured to determine that the received subframe is outside of the discovery window, wherein the processor is further configured to:
determine whether the received subframe comprises the full subframe, the end partial subframe, or the initial partial subframe, wherein determining the presence of the CSI resources is based on whether the received subframe comprises the full subframe, the end partial subframe, or the initial partial subframe.

29. The apparatus of claim 28, wherein a time and a frequency location of the CSI-RS information and CSI-IM information within the received subframe depend on a configuration or type of the partial subframe.

30. The apparatus of claim 27, wherein to determine the relative position of the received subframe, the processor is further configured to determine that the received subframe is inside of the discovery window, wherein the processor is further configured to:
determine whether the received subframe comprises a discovery reference signal (DRS) subframe, wherein determining the presence of CSI resources is further based on whether the received subframe comprises the DRS subframe.

* * * * *